United States Patent
Bartolomé Rodrigo et al.

(10) Patent No.: US 12,197,780 B2
(45) Date of Patent: Jan. 14, 2025

(54) METHODS PROVIDING NETWORK SERVICE RESTORATION CONTEXT AND RELATED SERVICE INSTANCE SETS AND STORAGE RESOURCE NODES

(71) Applicant: Telefonaktiebolaget LM Ericsson (publ), Stockholm (SE)

(72) Inventors: Maria Cruz Bartolomé Rodrigo, Madrid (ES); Attila Mihály, Dunakeszi (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 560 days.

(21) Appl. No.: 17/295,356

(22) PCT Filed: Nov. 19, 2019

(86) PCT No.: PCT/EP2019/081779
§ 371 (c)(1),
(2) Date: May 19, 2021

(87) PCT Pub. No.: WO2020/104448
PCT Pub. Date: May 28, 2020

(65) Prior Publication Data
US 2022/0019380 A1    Jan. 20, 2022

(30) Foreign Application Priority Data

Nov. 19, 2018 (EP) .................................. 18382829

(51) Int. Cl.
*G06F 3/06* (2006.01)
*H04L 67/60* (2022.01)

(52) U.S. Cl.
CPC .......... *G06F 3/0659* (2013.01); *G06F 3/0604* (2013.01); *G06F 3/067* (2013.01); *H04L 67/60* (2022.05)

(58) Field of Classification Search
CPC ..... H04L 67/60; H04L 67/63; H04L 67/1097; G06F 3/067; G06F 3/0655; G06F 3/0604
See application file for complete search history.

(56) References Cited

U.S. PATENT DOCUMENTS 10,637,834 B2 * 4/2020 Lee ..................... H04L 63/062
11,729,742 B2 * 8/2023 Chen ................... H04W 68/005
370/329

(Continued)

OTHER PUBLICATIONS

International Search Report and Written Opinion dated May 3, 2020 for International Application No. PCT/EP2019/081779 filed Nov. 19, 2019, consisting of 10-pages.

(Continued)

*Primary Examiner* — Nam T Tran
(74) *Attorney, Agent, or Firm* — Weisberg I.P. Law, P.A.

(57) ABSTRACT

A method to operate a first service instance set associated with a first storage resource node. The first service instance set may be for a service, and the first storage resource node may store context data for the service. An access context request may be transmitted to the first storage resource node, and the access context request may include an identification for a subgroup of context data being requested from the first storage resource node. An access context response may be received from the first storage resource node. The access context response may correspond to the access context request, and the access context response may include the subgroup of context data corresponding to the identification.

24 Claims, 15 Drawing Sheets

(56) References Cited

U.S. PATENT DOCUMENTS

| | | | | |
|---|---|---|---|---|
| 2004/0221064 A1* | 11/2004 | Schneider | ............... | H04L 67/14 |
| | | | | 709/249 |
| 2013/0170432 A1* | 7/2013 | O'Brien | ............... | H04W 48/10 |
| | | | | 370/328 |
| 2013/0295891 A1* | 11/2013 | Moon | ..................... | H04W 4/16 |
| | | | | 455/414.1 |
| 2014/0078890 A1* | 3/2014 | Lu | ......................... | H04W 24/04 |
| | | | | 370/221 |
| 2016/0154870 A1 | 6/2016 | Lachaume | | |
| 2018/0314515 A1 | 11/2018 | de Kruijf et al. | | |
| 2019/0253520 A1* | 8/2019 | Maharana | ............... | H04L 67/63 |

OTHER PUBLICATIONS

3GPP TR 23.742 V1.0.0; 3rd Generation Partnership Project; Technical Specification Group Services and System Aspects; Study on Enhancements to the Service-Based Architecture (Release 16); Sep. 2018, consisting of 101-pages.

3GPP TS 23.501 V15.3.0; 3rd Generation Partnership Project; Technical Specification Group Services and System Aspects; System Architecture for the 5G System; Stage 2 (Release 15); Sep. 2018, consisting of 226-pages.

3GPP TS 23.502 V15.3.0; 3rd Generation Partnership Project; Technical Specification Group Services and System Aspects; Procedures for the 5G System; Stage 2 (Release 15); Sep. 2018, consisting of 330-pages.

\* cited by examiner

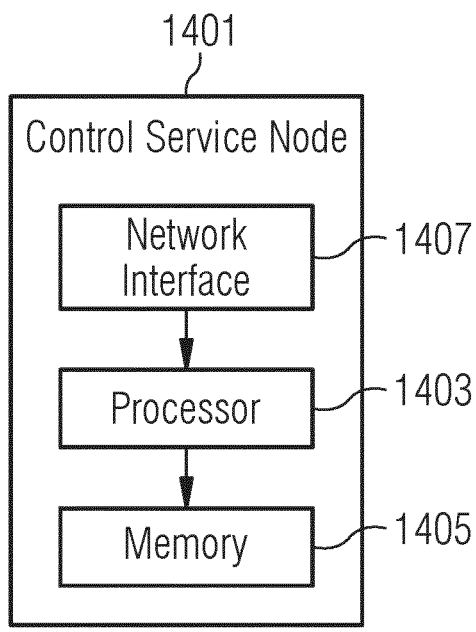
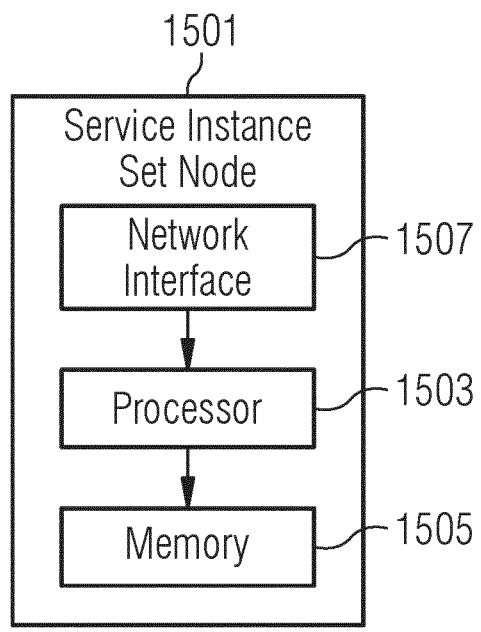
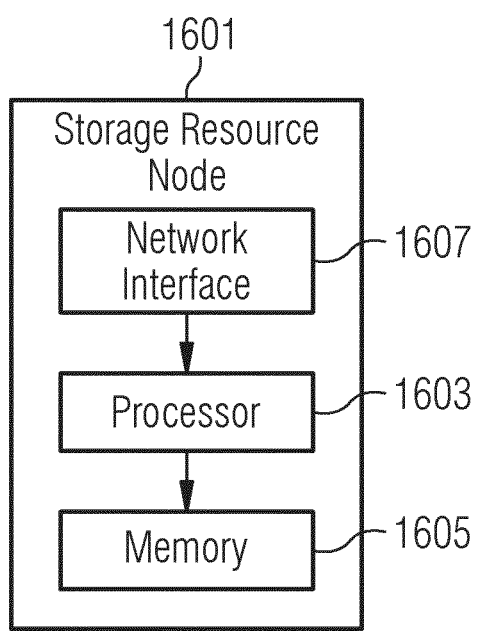

METHODS PROVIDING NETWORK SERVICE RESTORATION CONTEXT AND RELATED SERVICE INSTANCE SETS AND STORAGE RESOURCE NODES

CROSS-REFERENCE TO RELATED APPLICATIONS

This application is a Submission Under 35 U.S.C. § 371 for U.S. National Stage Patent Application of International Application No.: PCT/EP2019/081779, filed Nov. 19, 2019 entitled "METHODS PROVIDING NETWORK SERVICE RESTORATION CONTEXT AND RELATED SERVICE INSTANCE SETS AND STORAGE RESOURCE NODES," which claims priority to European Application No.: 18382829.2, filed Nov. 19, 2018, the entireties of both of which are incorporated herein by reference.

The present disclosure relates generally to communications, and more particularly to communication networks and related methods and network nodes/entities/functions/servers. 5G System Rel-15 has been released as documented in 3GPP TS 23.502 v15.3.0 "Procedures for 5G System; Stage 2" and 3GPP TS 23.501 v15.3.0 "System Architecture for 5G System; Stage 2".

The 5GC Control Plane as being defined in ongoing Rel-15 includes a disruptive change: traditional (pre-5GC) peer-to-peer interfaces and protocols are now replaced by a so-called SBA (Service Based Architecture), where each logical Network Function (NF) exposes one or multiple well-defined services (as a producer) to whatever other NF acting as service consumer by means of versioned HTTP2/REST APIs known as Service Based Interfaces (SBI). That is, there will be a network domain (basically the core network, CN) in which the different functional components are defined as Services, which are self-contained functionalities that can be changed and modified in an isolated manner (without affecting the other services).

A new Network Function named NRF (Network Repository Function) has been defined to provide NF-service discovery capabilities in 5GC, allowing NF-service producers to register their exposed NF-services (invoking the "NFRegister" operation offered through the "Nnrf_NFManagement" service by a NRF instance) for later NF-service consumers to discover them (through NRF exposed "Nnrf_NFDiscovery" service). A NF instance acting as service provider provides/updates at NF service registration time its "NF profile", including (among other information) all provided NF services and, for each of them, the related end-point addresses.

The services in 5GC will likely be built in a stateless way, i.e., the business logic and data context will be separated. This means that the services store their context externally in a proprietary DB. This will enable various cloud infrastructure features like auto-scaling or auto-healing.

In the context of the envisaged enhanced SBA (eSBA) as disclosed in 3GPP TR 23.742 v1.0.0 "Study on Enhancements to the Service-Based Architecture" (in the following denoted as "eSBA TR") a concept of a set of instances is discussed, see therein Solution 11 in clause 6.11.

This solution proposes to define a Services Instance Set concept that can support high reliability and also has potential to improve other aspects of the 5GC architecture. A Service Instance Sets comprises a set of instances of the same service type, wherein all Service instances in a set can access the same data storage e.g. UDSF.

As shown in FIG. 12, which corresponds to FIG. 6.11.2-1 of eSBA TR, a Service Instance Set has a storage resource accessible by all service Instances in the Set. A Service Instance Set may expose individual service instances towards consumers or it can use a load balancer. If a load balancer is used the Service Instance Set may appear as one Service Instance towards consumers.

When a Service Instance Set exposes multiple service instances towards a consumer, the consumer is allowed to reselect a different Service Instance (within the same set) between transactions.

As shown in FIG. 13, which corresponds to FIG. 6.11.2-2 of eSBA TR, a Service Instance Set may span multiple data centers As well, in the context of the eSBA TR, a requirement may be to achieve an independent management per each service, but sometimes this may not be possible as long as some defined services (in Rel-15) have some common data, that is accessed internally by implementation dependent interfaces. One possible solution for that problem is to do not consider those services as independent from a management perspective, but consider a group, referred to as a "deployment unit". This deployment unit may include two or more instances of different service types that are deployed together and are single vendor. Since the Service instances within the deployment unit may share some data, it may be difficult to accommodate access to a same Storage Resource for different operations relating to a same context.

SUMMARY

There is provided a method to operate a first service instance set associated with a first storage resource node. The first service instance set may be for a service, and the first storage resource node may store context data for the service. An access context request may be transmitted to the first storage resource node, and the access context request may include an identification for a subgroup of context data being requested from the first storage resource node. An access context response may be received from the first storage resource node. The access context response may correspond to the access context request, and the access context response may include the subgroup of context data corresponding to the identification.

There is further provided a method of operating a service instance set associated with a storage resource node, wherein the service instance set is for a service, and wherein the storage resource node stores context data for the service. A modify context request is transmitted to the storage resource node, wherein the modify context request includes an identification for a subgroup of context data of the storage resource node to be modified.

There is further provided a method of operating a storage resource node associated with a service instance set for a service, wherein the storage resource node stores context data for the service. An access context request is received from the service instance set, wherein the access context request includes an identification for a subgroup of context data being requested. An access context response is transmitted to the service instance set responsive to receiving the access context request including the identifier, wherein the access context response includes the subgroup of context data corresponding to the identification.

There is further provided a method of operating a storage resource node associated with a service instance set for a service, wherein the storage resource node stores context data for the service. A modify context request is received from the service instance set, wherein the modify context request includes an identification for a subgroup of context data to be modified. The context data of the storage resource node is modified responsive to the modify context request including the identification for the subgroup of the context data.

There are further provided service instance sets and storage resource nodes, being capable of performing the respective above methods.

According to some embodiments, subgroups of context data may be requested, transferred, and/or modified thereby improving transfer/signaling efficiency and/or enabling bulk transfer.

BRIEF DESCRIPTION OF THE DRAWINGS

The accompanying drawings, which are included to provide a further understanding of the disclosure and are incorporated in and constitute a part of this application, illustrate certain non-limiting embodiments. In the drawings:

FIG. 14 is a block diagram illustrating a control service node (also referred to as a service controller node) according to some embodiments;

FIG. 15 is a block diagram illustrating a service instance set (also referred to as a service instance set node) according to some embodiments;

FIG. 16 is a block diagram illustrating a storage resource node according to some embodiments;

DETAILED DESCRIPTION

Figure 1:
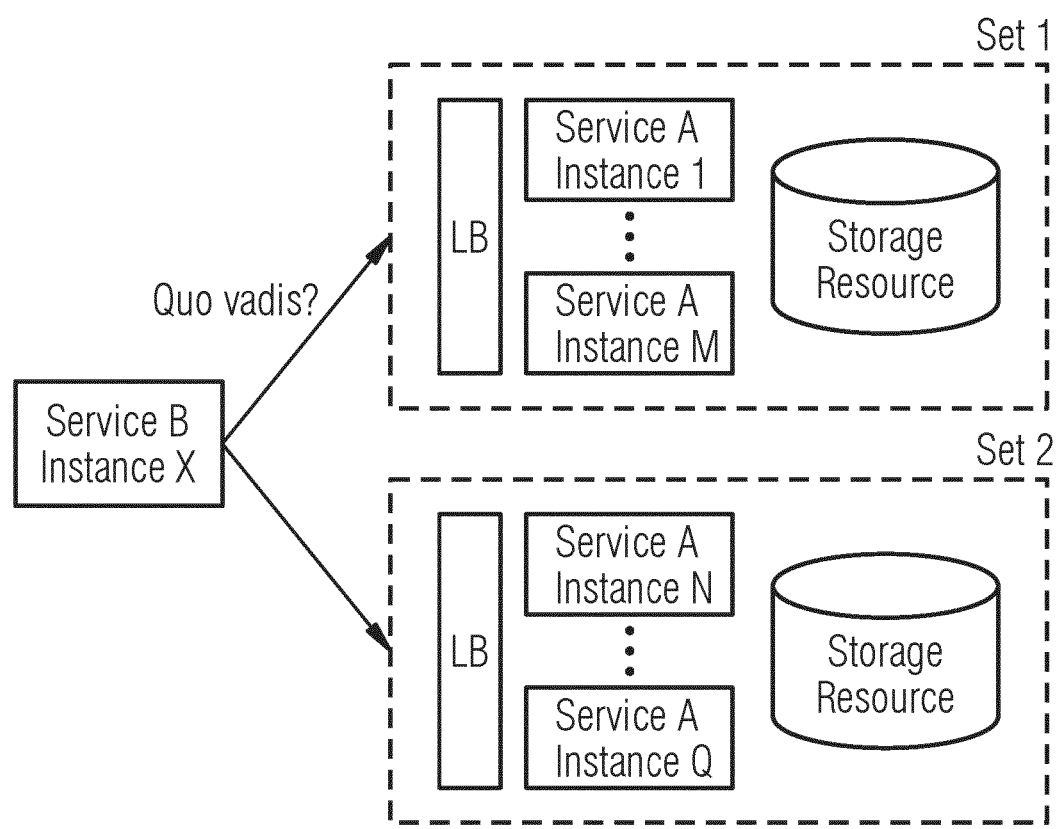
FIG. 1 is a block diagram illustrating service A instances deployed in two sets (also referred to as groups)

Embodiments will now be described more fully hereinafter with reference to the accompanying drawings. These embodiments are presented as teaching examples and are not to be construed as limiting the scope of the disclosed subject matter. For example, certain details of the described embodiments may be modified, omitted, or expanded upon without departing from the scope of the described subject matter.

FIG. 14 is a block diagram illustrating elements of control service node/entity/function/server 1401 (also referred to as a control service node) configured to support cellular communication according to some embodiments. As shown, control service node 1401 may include a network interface circuit 1407 (also referred to as a network interface) configured to provide communications with other network nodes/entities/functions/servers. The control service node may also include a processor circuit 1403 (also referred to as a processor) coupled to the network interface circuit 1407, and a memory circuit 1405 (also referred to as memory) coupled to the processor circuit. The memory circuit 1405 may include computer readable program code that when executed by the processor circuit 1403 causes the processor circuit to perform operations according to embodiments disclosed herein (e.g., operations illustrated in FIGS. 3,4, and/or 5, and/or operations discussed below with respect to respective example embodiments). According to other embodiments, processor circuit 1403 may be defined to include memory so that a separate memory circuit is not required.

As discussed herein, operations of the control service node 1401 may be performed by processor 1403 and/or network interface 1407. For example, processor 1403 may control network interface 1407 to transmit communications through network interface 1407 to one or more other network nodes/entities/functions/servers and/or to receive communications through network interface from one or more other network nodes/entities/servers. Moreover, modules may be stored in memory 1405, and these modules may provide instructions so that when instructions of a module are executed by processor 1403, processor 1403 performs respective operations. Operations of control service node 1401, for example, may be performed by one server or distributed across a plurality of network servers having the structure of FIG. 14, and a plurality of such distributed servers may be collectively referred to as a server. According to some embodiments control service node 1401 may be provided as a virtual control service node. FIG. 15 is a block diagram illustrating elements of service instance set/node/entity/function/server 1501 (also referred to as a service instance set or a service instance set node) configured to support cellular communication according to some embodiments. As shown, service instance set 1501 may include a network interface circuit 1507 (also referred to as a network interface) configured to provide communications with other network nodes/entities/functions/servers. The service instance set may also include a processor circuit 1503 (also referred to as a processor) coupled to the network interface circuit 1507, and a memory circuit 1505 (also referred to as memory) coupled to the processor circuit. The memory circuit 1505 may include computer readable program code that when executed by the processor circuit 1503 causes the processor circuit to perform operations according to embodiments disclosed herein (e.g., operations discussed below with respect to the flow charts of FIGS. 20 and/or 21 and/or operations discussed below with respect to respective example embodiments). According to other embodiments, processor circuit 1503 may be defined to include memory so that a separate memory circuit is not required.

As discussed herein, operations of the service instance set 1501 may be performed by processor 1503 and/or network interface 1507. For example, processor 1503 may control network interface 1507 to transmit communications through network interface 1507 to one or more other network nodes/entities/functions/servers and/or to receive communications through network interface from one or more other network nodes/entities/servers. Moreover, modules may be stored in memory 1505, and these modules may provide instructions so that when instructions of a module are executed by processor 1503, processor 1503 performs respective operations. Operations of control service node 1501, for example, may be performed by one server or distributed across a plurality of network servers having the structure of FIG. 15, and a plurality of such distributed servers may be collectively referred to as a server. According to some embodiments service instance set 1501 may be provided as a virtual service instance set.

FIG. 16 is a block diagram illustrating elements of storage resource node/entity/function/server 1601 (also referred to as a storage resource node or a service storage resource node) configured to support cellular communication according to some embodiments. As shown, storage resource node 1601 may include a network interface circuit 1607 (also referred to as a network interface) configured to provide communications with other network nodes/entities/functions/servers. The storage resource node may also include a processor circuit 1603 (also referred to as a processor) coupled to the network interface circuit 1607, and a memory circuit 1605 (also referred to as memory) coupled to the processor circuit. The memory circuit 1605 may include computer readable program code that when executed by the processor circuit 1603 causes the processor circuit to perform operations according to embodiments disclosed herein (e.g., operations discussed below with respect to respective example embodiments). According to other embodiments, processor circuit 1603 may be defined to include memory so that a separate memory circuit is not required.

As discussed herein, operations of the shared service resource node 1601 may be performed by processor 1603 and/or network interface 1607. For example, processor 1303 may control network interface 1607 to transmit communications through network interface 1307 to one or more other network nodes/entities/functions/servers and/or to receive communications through network interface from one or more other network nodes/entities/servers. Moreover, modules may be stored in memory 1605, and these modules may provide instructions so that when instructions of a module are executed by processor 1603, processor 1603 performs respective operations. Operations of control service node 1601, for example, may be performed by one server or distributed across a plurality of network servers having the structure of FIG. 16, and a plurality of such distributed servers may be collectively referred to as a server. According to some embodiments service storage resource node 1601 may be provided as a virtual service storage resource node.

While FIGS. 14-16 illustrate the structure of a control service node/entity/function/server, a service instance set node/entity/function/server, and a storage resource node/entity/function/server, respectively, other network nodes/entities/functions/servers may have the same/similar structure including a network interface, a processor, and memory.

As used herein, a node may be a virtual node, a service, entity, function, and/or server. For example, such a structure including a network interface, a processor, and memory may be used for a consumer node/entity/functions/server, producer node/entity/functions/server, network repository function node/entity/functions/server, single point of access node/entity/functions/server, load balancer node/entity/functions/server, storage resource node/entity/functions/server, service instance node/entity/functions/server, NRF service instance node/entity/functions/server, etc. A radio access network RAN node may be provided using a similar structure with a transceiver also coupled with the processor to provide wireless communication with one or more wireless devices (also referred to as UEs, User Equipment, User Equipment nodes, wireless terminals, etc.) over a radio interface.

FIG. 1 is provided as an example, where instances of same Service A are deployed in two different Sets, i.e., there are two groups of instances (also referred to as sets of instances) that have access to different storage resources. FIG. 1 illustrates Service A deployed in two sets. In FIG. 1, each set of instances may just offer one single point of access (e.g. a Uniform Resource Identifier, URI) to Service B (or any other consumer). As an example, a load balancer LB is included to reflect that, but other solutions may be possible, and this is not part of this disclosure.

Figure 2:
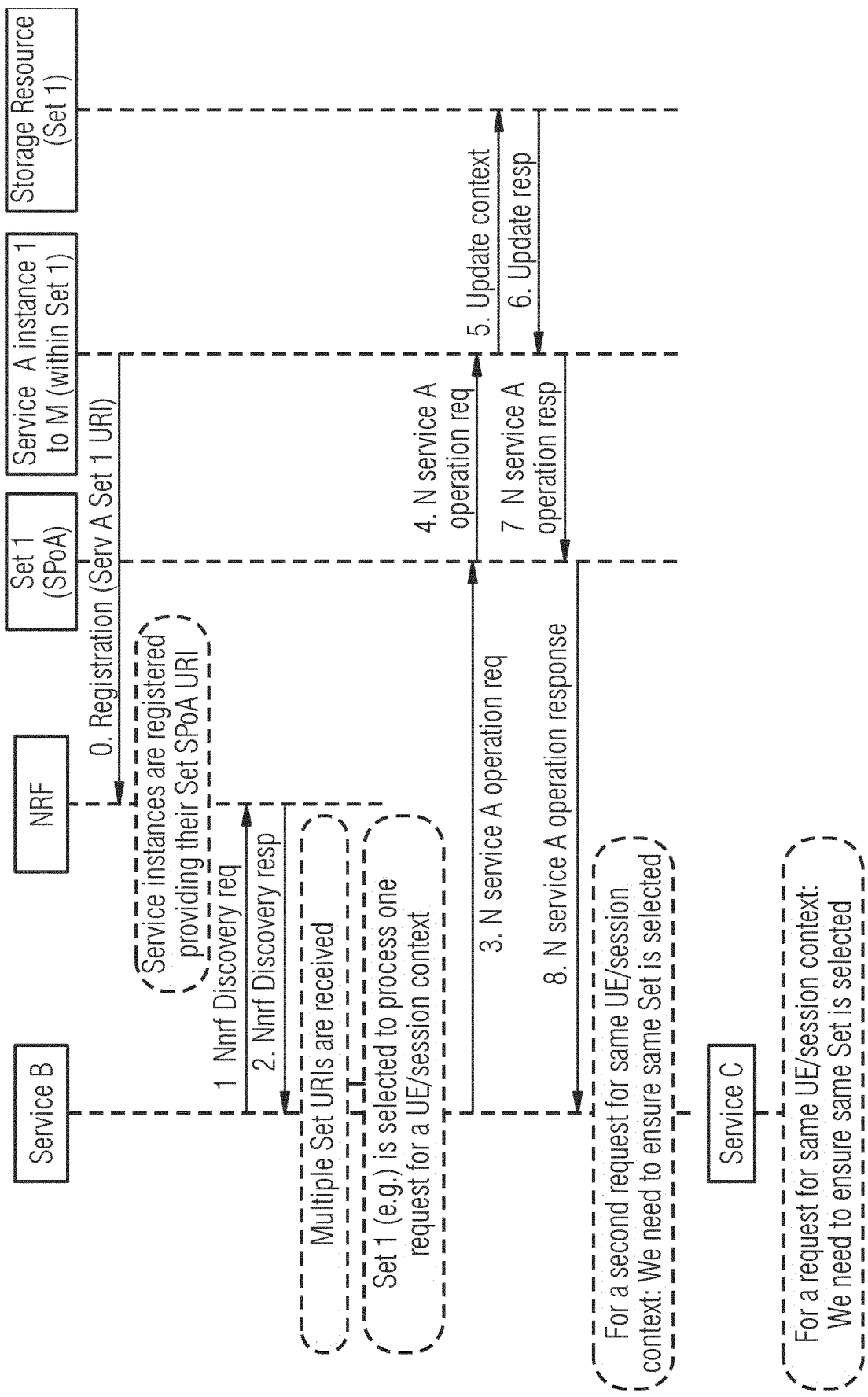
FIG. 2 is a message diagram illustrating selection of a same set for a same UE/session context.

FIG. 2 illustrates a same set that may need to be selected for the same UE/session context. Operations of FIG. 2 are discussed below:

Operation 0. Service A instances registered to an NRF (also referred to as an NRF node/entity/function/server) providing a single URI for the whole Set. This may correspond to a LB or any other solution to hide the pool of instances. Set SPoAs (Single Point of Access) are displayed in the figure to ease understanding that the instances are not contacted directly by the end consumer, but via a SPoA for each Set.

Operation 1. Service B (valid a well for Service C, for any consumer of Service A) discovers Service A from the NRF.

Operation 2. Service B gets both Set 1 and Set 2 in the discovery response.

Operation 3. Service B selects one Set (either 1 or 2) to perform a Service A operation (e.g. a request) for a UE/session context (e.g. SUPI, PDU Session Id). Selection could be based in multiple criteria or even be random. In this example, Set 1 is selected, then Service B sends the Service A operation to the SPoA for Set1.

Operation 4. The operation will reach one instance within the Set. This may be done by means of a LB that selects the less loaded instance.

Operation 5. The execution of the Service A operation may modify the UE/session context, that is then stored in the Storage Resource that is deployed for Set1.

Operation 6. Response of the update operation

Operations 7 and 8. Response of the Service A operation

Then, a subsequent operation by Service B for the same UE/session context shall reach same Set. If a different Set is selected, this new operation may not take into account updated context by previous operation. This situation may be quite frequent, e.g. the AMF (also referred to as an AMF node/entity/functions/server) receives different interaction from the same UE (also referred to as a wireless device), for same or different DNN and NSSAI, then same or different PDU Sessions are created/selected . . . those values may identify a context that is modified and kept in the Storage Resource within the Set, that defines and state.

The same applies to any other Service (e.g. service C) that may be required to operate on the same UE/session context. This is as well quite frequent, e.g. for Exposure services, for Rel-15, each/most NFs have defined an Exposure service, that may be required to provide access to other NFs to the data that is managed by the NF (also referred to as an NF node/entity/functions/server), then the Exposure service should access data that is owned and manipulated by other NF services. Another example, some services allow an external service to subscribe to receive notifications upon certain events/updates, then the external service should send this subscription to the same Set (i.e. the exact same service (or group of services) that are able to access the same Storage Resource).

Apart from that, in the context of the eSBA TR there may be a requirement to achieve an independent management per each service, but sometimes this may not be possible as long as some defined services (in Rel-15) have some common data, that is accessed internally by implementation dependent interfaces. But, even though in Rel-15 some services are defined with those dependencies, how to provide operation on that shared data (by multiple services, at least two) may be unresolved.

In summary, it may be desirable to provide operations on the same UE/session context by accessing the same Storage Resource.

Some embodiments herein may provide a new element named service producer controller or control service node that acts as a Front-End of the multiplicity of service producer instances in the system/network/deployment. There may be only one single logical Service producer controller, but this does not preclude multiple instances being defined and hidden by e.g., a load-balancer or a DNS-based resolution service.

In the following disclosure, the term "Storage Resource Group" is used to refer to all the consumer instances that may be required to use the same storage resource, to be able to provide access to shared data, i.e. all consumer instances within a set or within a deployment unit.

According to some embodiments disclosed herein, the sets of instances may be registered to the new controller (instead of to the NRF), while the controller registers itself to the NRF with a single URI.

Then the controller may keep track of registered sets and their availability and may select the very same set for the operations that may be required to access the same UE/session context, in order to provide that the operations always access the fresh updated data.

Procedures proposed in the present disclosure are described with the following call flows.

Figure 3:
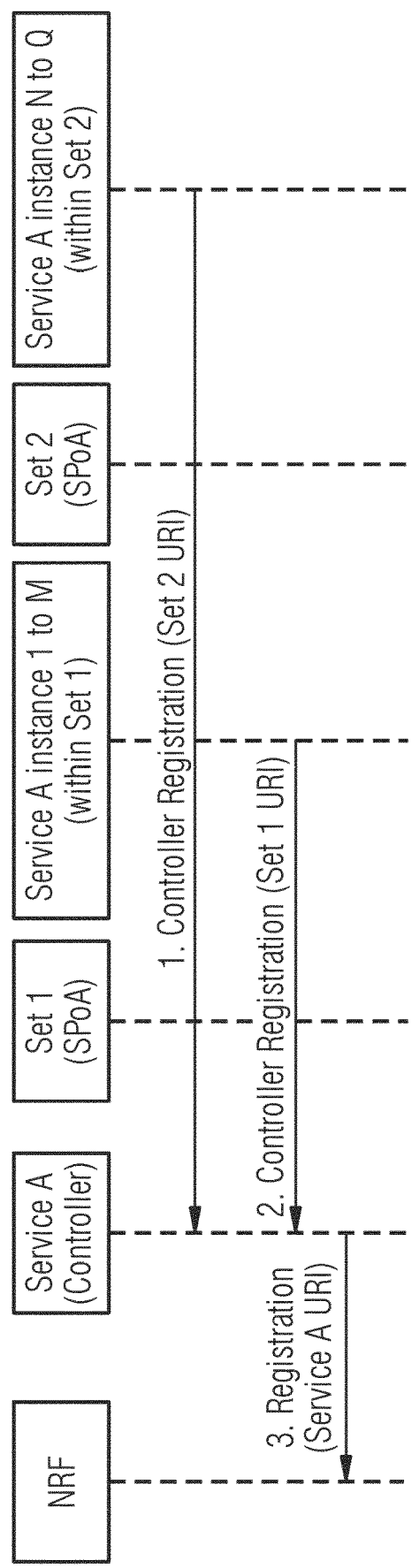
FIG. 3 is a message diagram illustrating instance registration with a control service node according to some embodiments.

FIG. 3 illustrates a new registration to the controller.

A change is that only one SPoA, one URI is registered in the NRF as providing Service A, while each set may need to register to the controller rather than to the NRF. This is explained with respect to FIG. 3, where numbered operations do not need to go in any order, just numbered to ease description.

Operations of FIG. 3 are discussed below:

Operation 1. Instances M to Q or service A are deployed in a set (pool) offering as a single URI (e.g. of a LB). All the instances within the set register a single URI is in the controller entity as the SPoA for Set 2. This registration may be referred to as "Controller Registration" since it is not the existent registration in the NRF, however, the mechanism is similar.

In fact, the service instances do not need to know whether they register to the NRF or to a controller, they could use exactly the same procedures and messages. In this sense this does not need to be standardized. This may allow inclusion in a deployment using a controller by Ericsson, while the service instances are by another vendor.

Operation 2. Similar to operation 1 for instances within Set 1.

Operation 3. Only one single URI is registered for Service A, this corresponds to the entity that acts as the controller for this Service A. Multiple instances of the controller could be instantiated, and then a single URI could be offered in the say way as for the sets.

The controller registers into the NRF exactly as if it were a regular service A instance, then standardization may not be required.

In the following call flow, there is a Service Instance Set (SIS) of the consumer service, and two different SISs for the service producer.

For the SIS consumer, the storage resource is included in the figure, that has been omitted for simplicity in SIS1_Producer and SIS2_Producer. Moreover, for the SIS producers a SPoA is offered, by e.g. a LB, this is equally excluded from the figure.

In the figure, it is considered optional the existence of a separated Storage Resource as an independent and external service. This is why the interactions with this element are marked as optional (dotted lines).

Figure 4:
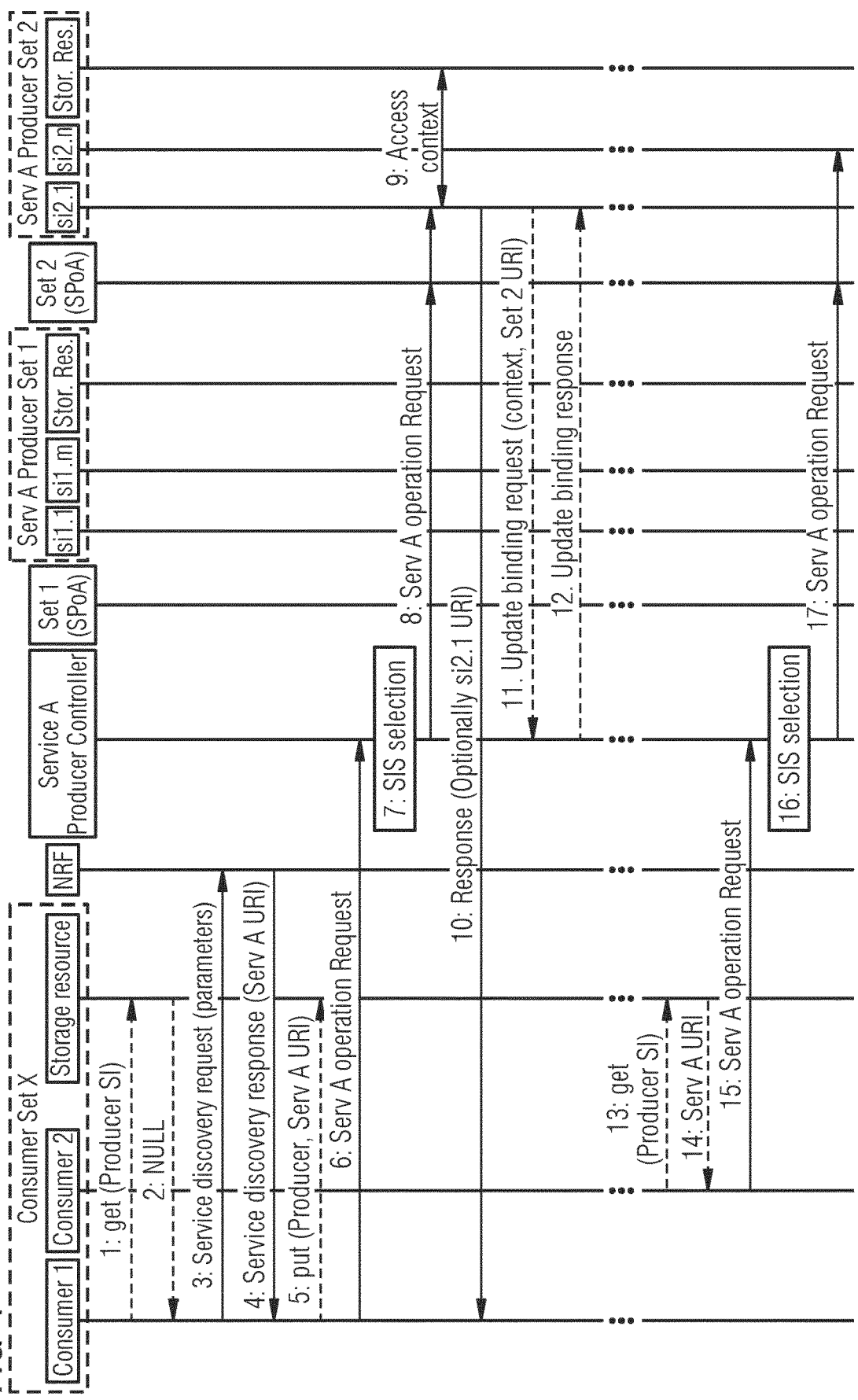
FIG. 4 is a message diagram illustrating set selection for a UE/session context according to some embodiments.

FIG. 4 illustrates Selection of the right Set for a UE/session context. Operations of FIG. 4 are discussed below:

Operation 1. Consumer 1 wants to send a request to Service A (producer), and then it first checks if the right address to use to contact that service is stored from a previous interaction.

Operation 2 In this example, the address is not stored.

Operation 3. Then the consumer needs to discovery the means to contact Service A.

Operation 4. Discovery response includes the Service A URI. This corresponds to the "Service A producer controller", but from a consumer perspective the "Service A producer controller" is just a Service A.

Operation 5. The consumer may store the Service A URI in the Storage Resource.

Operation 6. Consumer sends a Service A operation request to the Service A, using the URI received that corresponds to the "Service A Producer Controller"

Operation 7. The Controller receives the Service A operation request, and needs to select to which Set of instances it is sent. First, it must check if there is a set already assigned to the corresponding UE/session context. The UE/session context shall be included in the Service A operation request, today it is considered an HTTP/REST interface, then it should be included in the HTTP body. E.g. if the operation is for SUPI-Y and for PDU Session Id-X, this should be included in the request. Then, the controller reads the request and needs to know which parameters should be used to identify a UE/session context, e.g. SUPI and PDU Session. Then based on those, it checks if there is already a Set assigned, checking a mapping that has to be kept in permanent memory (either internal or external).

If a set is already assigned to that UE/session context, then the same set is selected. If there is not a Set assigned yet, then the controller selects one from the available ones (in this case Set 1 and Set 2). The selection could be based on different criteria, e.g. load. Then, the controller keeps record of this assignment in permanent memory.

Operation 8. The controller forwards the Service A operation request to the selected set (in this case Set 2 SPoA) using registered URI. The forwarded request includes the URI of the consumer, Set 2 SPoA chooses one instance within this set, this selection could be based in different criteria (e.g. load). Corresponding Service A instance executes the request using the stored UE/session context in its set storage resource.

Operation 9. The instance receiving the operation request accesses the stored context in order to be able to process the request. It may also need to manipulate part of the stored context.

Operation 10. The Service A operation response is sent back to the consumer (either directly, as in the figure, or through the Set 2 SPoA). It may optionally include the URI of the specific instance within the set that has managed the request, that could be used to minimize extra hops and establish a direct communication during the same procedure execution flow.

Operations 11 and 12. In case this UE/session context is created or deleted, then the Controller has to either create or delete the corresponding mapping, in this case it is relevant that only when the operation has successfully performed the affected service instance informs back to the Controller.

Operation 13. In a later stage, another consumer instance within the same Consumer Set wants to send a request to Service A, then it first checks whether for that Service A a contact URI is already available.

Operation 14. In this case, the Service A URI is available (it was stored in operation 5), then it is provided to the consumer instance 2.

Operation 15. Consumer instance 2 sends a Service A operation using stored URI, that corresponds to the controller.

Operation 16. The controller needs to select a set. It needs to read corresponding parameters received in the request to be able to identify the UE/session context, and then check if it has already stored a mapping to any Set. In this case, this mapping has been stored in operation 11 (when it was created), then Set 2 (SPoA) is selected.

Operation 17. As in Operation 8, the controller forwards the request to Set 2 SPoA, which chooses one instance within this Set, this selection could be based in different criteria (e.g. load). As explained above, in the context of the eSBA TR there may be a requirement to achieve an independent management per each service, but sometimes this may not be possible as long as some defined services (in Rel-15) have some common data, that is accessed internally by implementation dependent interfaces.

A possible solution for that problem is to not consider those services as independent from a management perspective, but fit those into a group. For example, if Service A and Service B have some data in common, (they are dependent to each other processing and updating of internal UE/session context), then they can be defined to be deployed always together as part of what may be referred to as a "Deployment Unit" DU.

This deployment unit may be provided in two or more instances of different service types, that then are deployed together and are single vendor. Since the Service instances within the deployment unit share some data, they need to access same Storage Resource, and this may be addressed according to some embodiments disclosed herein.

A similar solution to what is described above applies, with some modifications as explained in following call flow.

Figure 5:
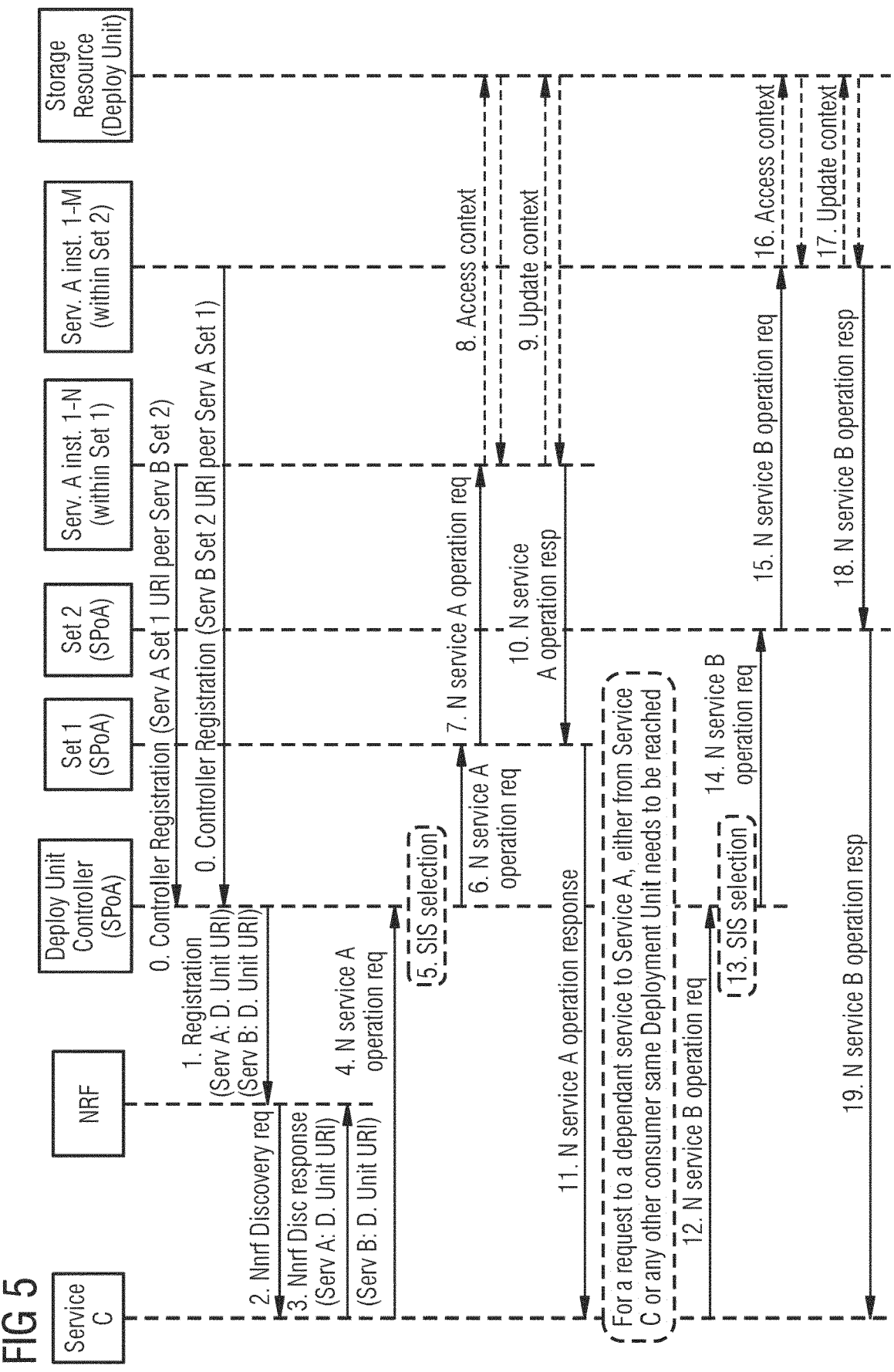
FIG. 5 is a message diagram illustrating set selection for a UE/session context for dependent services according to some embodiments.

FIG. 5 illustrates selection of the right set for a UE/session context for dependent services. Operations of FIG. 5 are discussed below:

Operation 0. Similar to operation 1 in FIG. 3 above. The difference is that now the Controller acts as a controller for the whole Deployment Unit (DU), that involves two or more dependent services. Then, the controller keeps track of what services belong to the DU, and which Sets serve each service.

Another difference may be that in order to provide that both Service A and B have access to the same Storage Resource, a deployment requirement may be defined: same Storage Resource must be shared by at least one Set of the dependent services (A and B in our example). Then Service A Sets are peered with Service B Sets (peered Set access to the same Storage Resource). Information about Set peers is provided at Controller Registration, e.g., in a form of naming conventions in the set URIs.

Operation 1. DU Controller registers only its URI into the NRF, as the serving URI for all the services that belong to the DU. In this example, for Services A and B.

Operations 2 and 3. Service C wants to contact Service A, then it has to get its URI by NRF discovery. The DU URI is provided back for Service A. If Service C wants to use as well Service B (in operation 11), then same DU URI is provided.

Operation 4. Service C sends a Service A operation to the corresponding DU URI.

Operation 5. The DU controller needs to perform similar checks as in previous FIG. 4, operation 7, plus something else. In this case, the DU controller could receive requests for multiple services (A and B), that are identified by the same URI, while in the former case the URI of the Controller only identifies one single Service. Then, DU Controller needs to identify the right service name (in the request), to forward the request to the right Set.

Operations 6 to 11 are similar to FIG. 4, operations 8 to 10. FIG. 4 operations 11 and 12 may be applicable in this case as well, not included in the figure for simplicity.

Operation 12. Service C wants to execute a Service B operation, that is dependent to Service A. Then it sends the request to the URI received at discovery (operation 3), that corresponds to the same DU Controller.

Operation 13. The Controller performs same tasks as in FIG. 4, operation 16. The important difference is that in this case, the controller needs to select the Set for Service B (for the corresponding UE/session context) based on the assigned Set for dependent Services (in this case Service A). Only a peered Set could be selected, in order to have access to the same Storage Resource.

Operations from 14 to 19. They are similar to operations 6 to 11 in this flow.

Some embodiments disclosed herein may provide one or more of the following advantages:

- In the case of services (e.g. A and B) that have some dependencies (i.e., they share data), that are defined as a group (Deployment Unit), some embodiments may provide a solution to be able to access from the different services within the Deployment Unit to the same Storage Resource. This may allow that the Deployment Unit has independent LCM.
- Some embodiments may provide that operations on the same UE/session context access the same Storage Resource, where this UE/session context is stored. Otherwise, any transaction that requires information about the current state may not work (and in 5GC most, if not all, transactions may be required to continue from a previous state).
- Some embodiments may not impose any constraints on how the services are organized in sets and how the sets are scaled, and also may allow use of other methods to shorten the communication latency, e.g., based on direct communication between the service instances. As discussed with respect to FIGS. 3-5, 14, 17, 18, and 19, herein, a control service node (also referred to as a service producer controller and/or a service controller node) may act as a front end of a multiplicity of service producer instances (also referred to as service instance sets or service instance set nodes). There may only be one single logical Service producer controller, but this does not preclude multiple instances from being defined and hidden by e.g., a load-balancer or a DNS-based resolution service.

Instead of registering the Sets of instances to the NRF, the Sets of instances can be registered to the new Controller (service controller node), which registers itself to the NRF with a single URI. Then the Controller keeps track of registered Sets and their availability, and selects the very same Set for the operations that require to access the same UE/session context, in order to ensure that the operations always access the fresh updated data.

Operators may require that even though the instances within a Set could be by a single vendor, there may be multiple Sets (for the same service type) by different vendors. One concern is that a service provided by a Set that is supported by one vendor may become unavailable (e.g., failure, maintenance . . . ) and another Set supporting the service may be provided by another vendor.

This may require providing a way for a consumer to continue using a service when a new producer of Set1 (a first service instance set) takes over a former producer Set2 (a second service instance set). Potentially Set1 and Set2 may be provided by different vendors.

Taking into account each Set owns a Storage Resource as described in FIG. 1 above, it may be desirable to provide a way to store required context in the new Storage Resource Node.

FIG. 1 above could be updated to reflect that it is not only possible to provide a SPoA in front of the pool of instances, but alternatively the consumer may select one from the pool. This is a more general case that is covered in FIG. 6.

Figure 6:
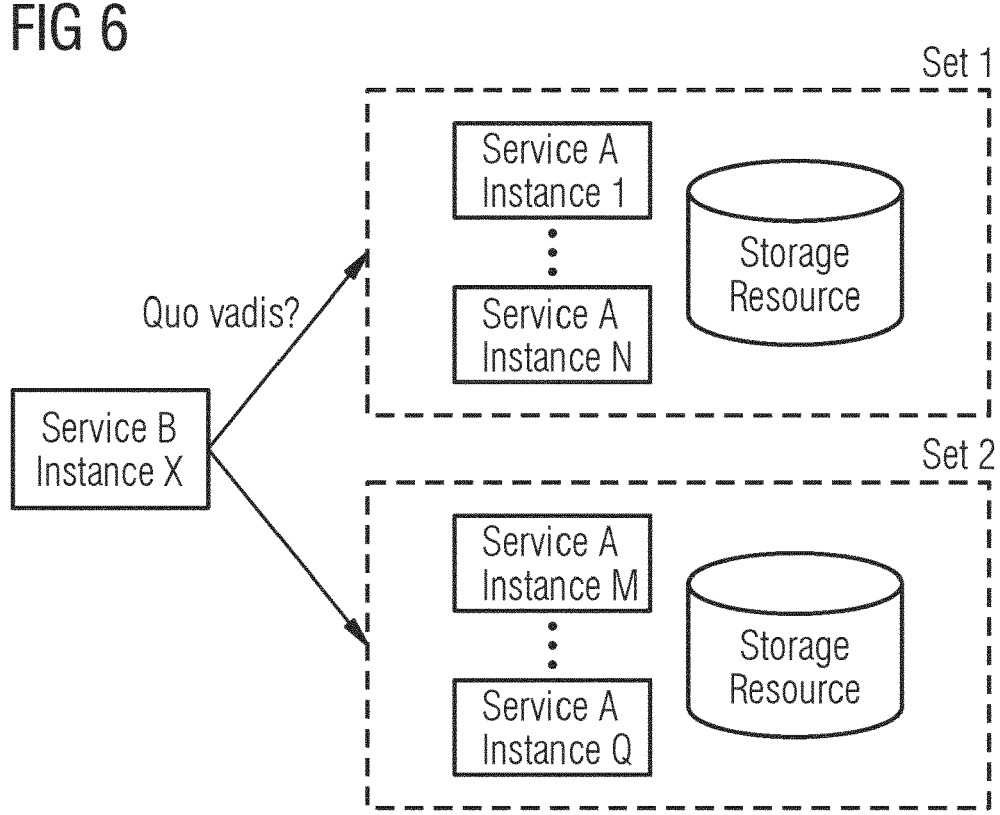
FIG. 6 is a block diagram illustrating service A instances deployed in two sets (also referred to as groups) where a Service B selects one in each pool or a SPoA is provided for each pool according to some embodiments.

FIG. 6 illustrates Service A instances are deployed in two Sets, either service B select one in each pool or an SPoA is provided for each pool In order to support such a Context Transfer, it may be required to identify what is the data to be transferred. One approach could be to transfer all data from the storage resource of Set 1, However, this storage resource may normally hold vendor implementation and vendor features specific data that may be useless for other vendor instances (in the alternative Set). Even if only all standard data is transferred, this may only fulfill requirements of the use case when all instances of Set 1 are to become inoperable (e.g., due to maintenance reasons). However, there can be other use cases that may require the transfer of only a subset of data, such as load re-balancing, transferring sessions related to specific slices, DNNs (Data Network Names), etc. Some embodiments herein may provide the identification and transfer of Network Service Restoration Context (NSRC) from a Set1 (of instances of a Service Type, Service A in the examples, by vendor A) to Set 2 (alternative group of instances of the same Service Type, potentially by other Vendor B), in order to support Service A continuity when a Set needs to be set out of the system (e.g., when another vendor C breaks in).

The NSRC may be a single group of data per service or may be divided into different subgroups. To be able to improve/optimize NSRC storage and recovery, some embodiments may identify different subgroups within an NSRC. Each subgroup is the data that is used/required to recover, that depends on the use case, and/or the specific failure. Each subgroup may be identified using an identifier ID.

The transfer of specific group(s) of data may then be supported by the specification of the group identifiers in the transfer operations Advantages provided by some embodiments may include supporting operator demands/requirements to deploy multiple Sets (for the same service type) by different vendors and be able to commute from one to another for exceptional cases (e.g. whole Set failure or controlled maintenance), by identifying the data that is to be accessible after commuting from one Set to another.

Some embodiments herein may identify the data that is to be transferred. This may provide/ensure that only the required subset of data is transferred, i.e., it may provide transfer volume efficiency. Moreover, it may enable bulk transfer, which may provide transfer related signaling efficiency.

One approach may be to transfer all data from the storage resource of Set 1, but this storage resource may normally hold vendor implementation and vendor features specific data, that may be useless for other vendor instances (in the alternative Set). Even if only all standard data is transferred, this may only fulfill the requirements of the use case when all instances of Set 1 are to become inoperable (e.g., due to maintenance reasons). However, there can be other use cases that may require the transfer of only a subset of data, such as load re-balancing, transferring sessions related to specific slices, DNNs etc.

When there are stateless instances of a Service A by a vendor A, in Set A, the data that the instances store in an external database DB (Storage Resource in FIG. 1) may vary depending on the requirements to be fulfilled.

One Stateless realization of service instances expectation is to allow a consumer to address any instance within the set and be provided with the same service. For this to occur, the following data may need to be stored:

1) Storage of the service context/session/state data useful/necessary to support instance failover to ensure service continuity of a service.

2) Storage of service context/session/state data useful/necessary to be able to choose different instances (of the same service type) for different transactions.

This may correspond to context/state information of finalized transactions.

However, a need for a consumer to move from a provider Set1 to another Set2 (potentially by other vendor) may be required to be only due to some events/triggers, that is, it is may not be expected that any Service B instance X (see FIG. 1) is able to randomly select Service A instances from different Sets (e.g., first request instance 1 is selected, next request instance P is selected . . . ).

The triggers/events that may determine when the Service B instance X has to move from Set1 to Set2 may be those that will be either related to Service A Set failure or controlled intervention (e.g., by operation and maintenance O&M, to e.g., upgrade Service A Set1). If for example, Set1 is by O&M set to be out of the system, then Context data that was stored in Storage Resource (Set1) may need to be transferred/moved to Storage Resource (Set2).

Figure 7:
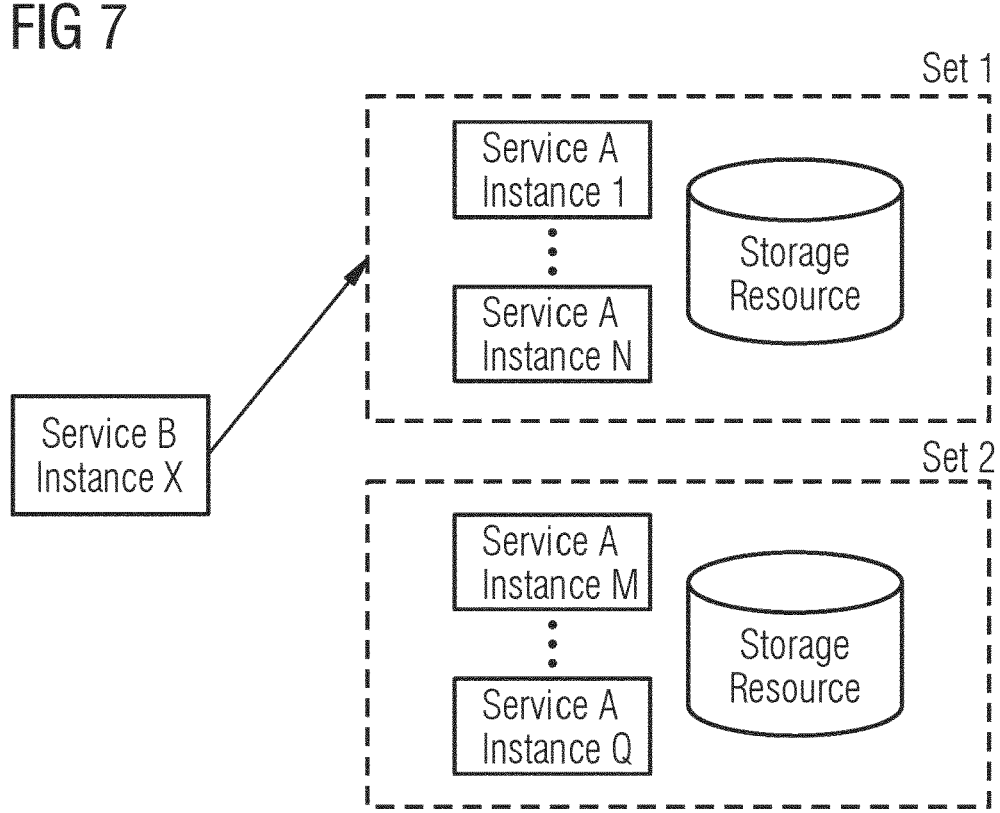
FIG. 7 is a block diagram illustrating a service B instance consuming Service A in Set 1 according to some embodiments.
Figure 8:
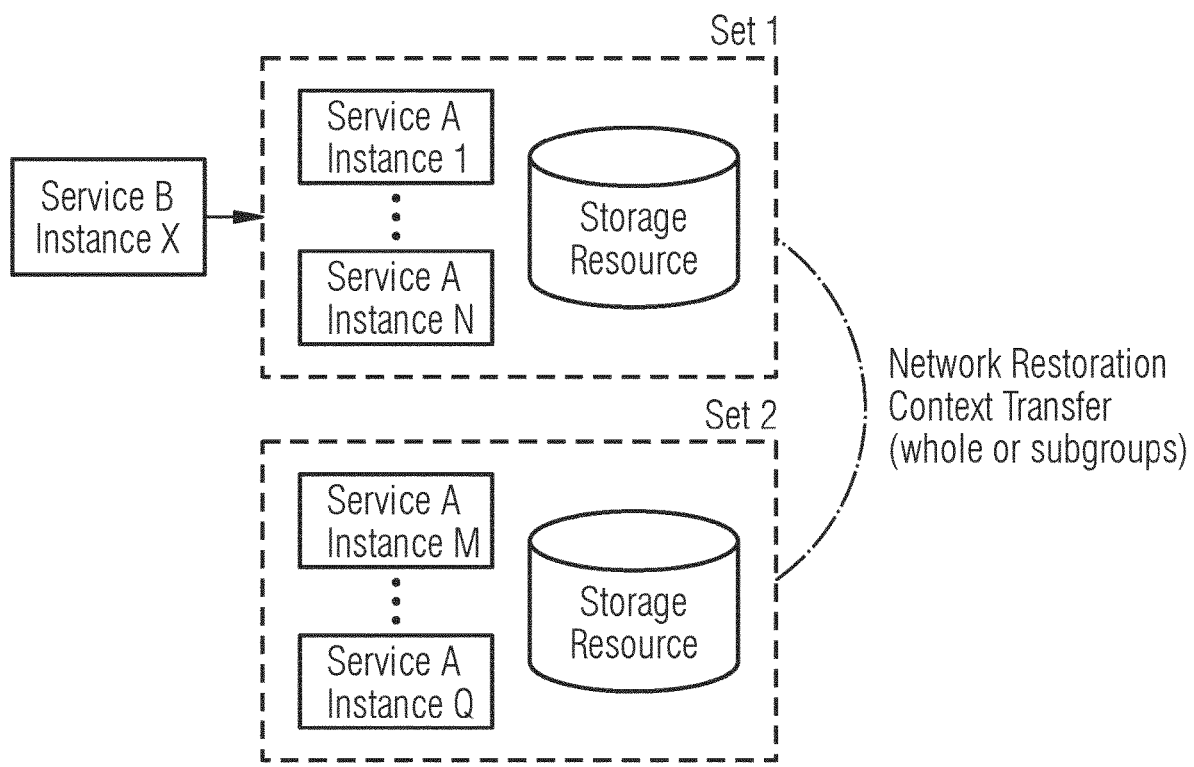
FIG. 8 is a block diagram illustrating a NSRC transfer from Set 1 to Set 2 according to some embodiments.

The process is explained in FIGS. 7 and 8:

FIG. 7 illustrates Service B Instance X consuming Service A in Set 1

In FIG. 7 a Service B may be consuming Service A provided by Set 1, which may be by Vendor 1. Then, in Set 1 Storage Resource the corresponding Context is stored.

FIG. 8 illustrates an NSRC transfer from Set 1 to Set 2.

The situation in FIG. 7 may be stable and may last for a long time, since Sets should normally be defined to be able to cope with errors, Sets may be scaled to cope with offered traffic, and resources may be highly available. However, there may be situations/events that could trigger a Set change, e.g. an operator may require to take Service A (by vendor A) out of system, due to different reasons, for example, when another vendor C is breaking in.

Some embodiments herein identify the data that may need to be transferred. This data should at least be the data that is expected to be accessible to the new service instances in Set 2. When operators are expected to cover exceptional cases (maintenances and whole Set1 failure), this data is what in 3GPP is known as Restoration data, i.e., it does not need to include all the data a service instance is using at a point in time, but just the data that defines a permanent state from a network perspective (i.e. from a consumer perspective), that needs to be recovered later. Using as an example AMF as the Service A (FIGS. 7 and 8 above), then if Set1 fails, to be able to recover network state from Set2 similar data to the one transferred at handover (user moves from AMF1 to AMF2) may be required. Then, the specific data to be stored may depend on each service business logic and expected network states to be recovered. This data may be referred to as "Network Service Restoration Context" (NSRC).

Figure 9:
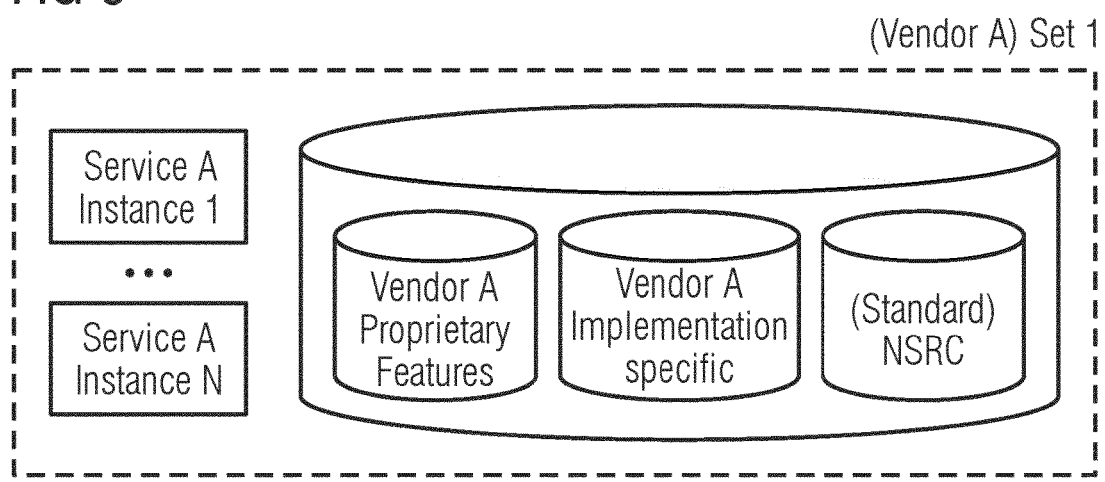
FIG. 9 is a block diagram illustrating vendor specific data versus NSRC according to some embodiments.

FIG. 9 illustrates the data that may be stored in the Storage Resource of a Set, while data on the NSRC is required to be transferred FIG. 9 illustrates vendor specific data versus Network Service Restoration Context NSRC.

The NSRC may be a single group of data per service, or may be divided into different subgroups. Each subgroup is the data that is required to recover, that depends on the use case, and/or the specific failure. For example, if we consider "SMF Selection Subscription Data" in ref [2] as described in following table (Table 1):

The following relationship could be inferred:
1 SUPI—n S-NS SAI
1 S-NSSAI—n Subscribed DNN
1 SUPI—n PDU Sessions Then, the context could be for just one DNN, or several; one whole S-NSSAI, or several (including all its subscribed DNNs; or whole SUPI.

Figure 10:
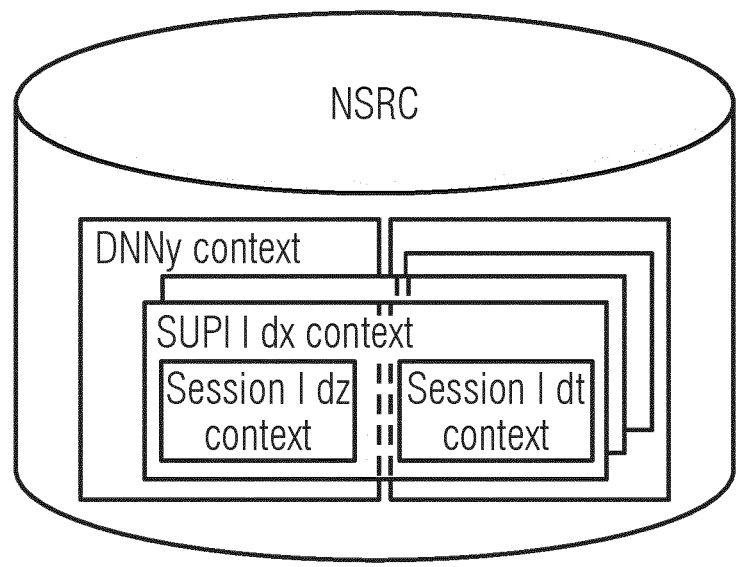
FIG. 10 is a block diagram illustrating context subgroups according to some embodiments.

FIG. 10 illustrates an example of context subgroups.

Then, the SMF may manage for a SUPI (Subscriber Permanent Identifier ID) multiple DNN (Data Network Name) and multiple Sessions. The SMF may be required to only recover a single SUPI (with all his sessions), or just one single session, or everything for a DNN or a Slice . . . . To be able to improve/optimize NSRC storage and recovery, some embodiments herein identify different subgroups within an NSRC. Each subgroup may be identified using an identifier Id, e.g. SUPI, PDU (Protocol Data Unit) Session Id . . . .

The existence of subgroups may not preclude the possibility to manage whole NSRC using an Identity. The identity may be composed by all the identifies of the different subgroups defined for each Service. This may allow avoiding defining a new identity that may not have a meaning for the service. Alternatively, other identifications may be possible.

NSRC data may be standardized when it is expected to be understood by different vendor service instances.

Apart from NSRC, each service may store in the service's Storage Resource any other data that may be needed internally (which may be implementation specific) and data required for proprietary features, which may not need to be standardized.

Then, once the NSRC is transferred, Set 1 may be set out of the system, and then Service B will continue consuming Service A but from Set 2, until another event/trigger determines another Set change. This is represented in FIG. 11.

Figure 11:
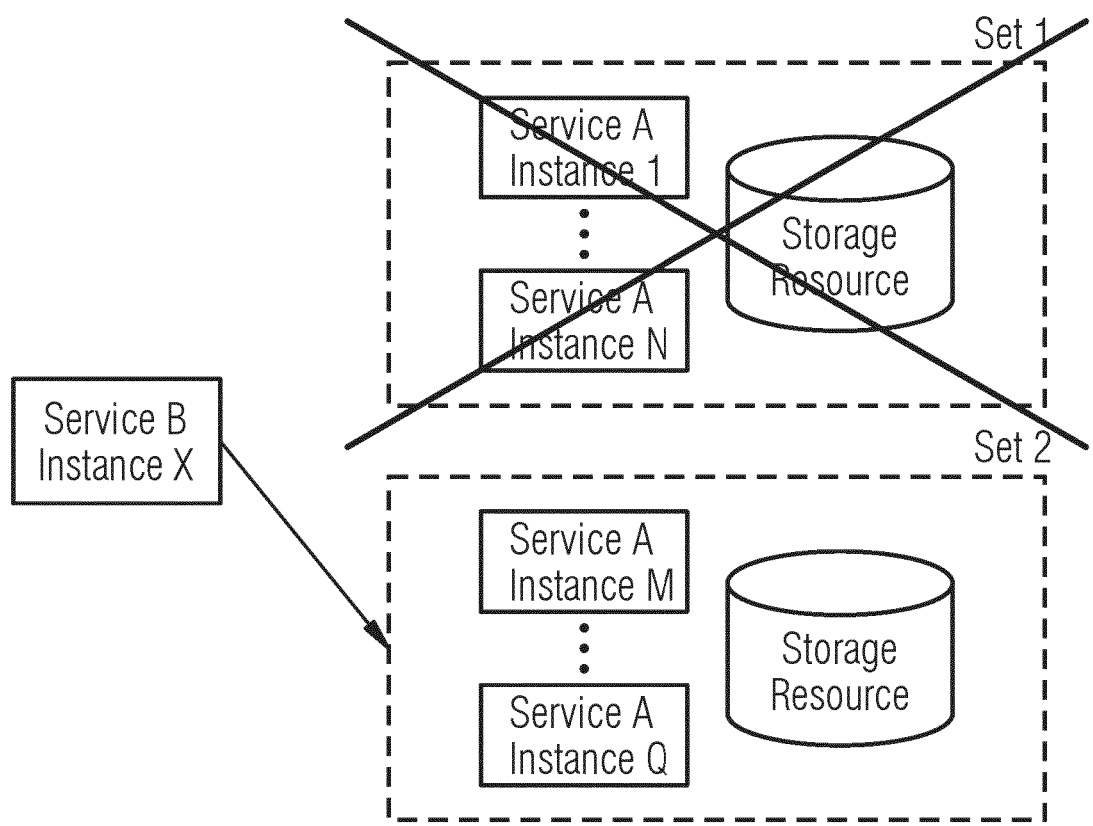
FIG. 11 is a block diagram illustrating that after NSRC is transferred, Set 1 is taken out of system and Service B continues consuming Service A from Set 2 according to some embodiments.
Figure 12:
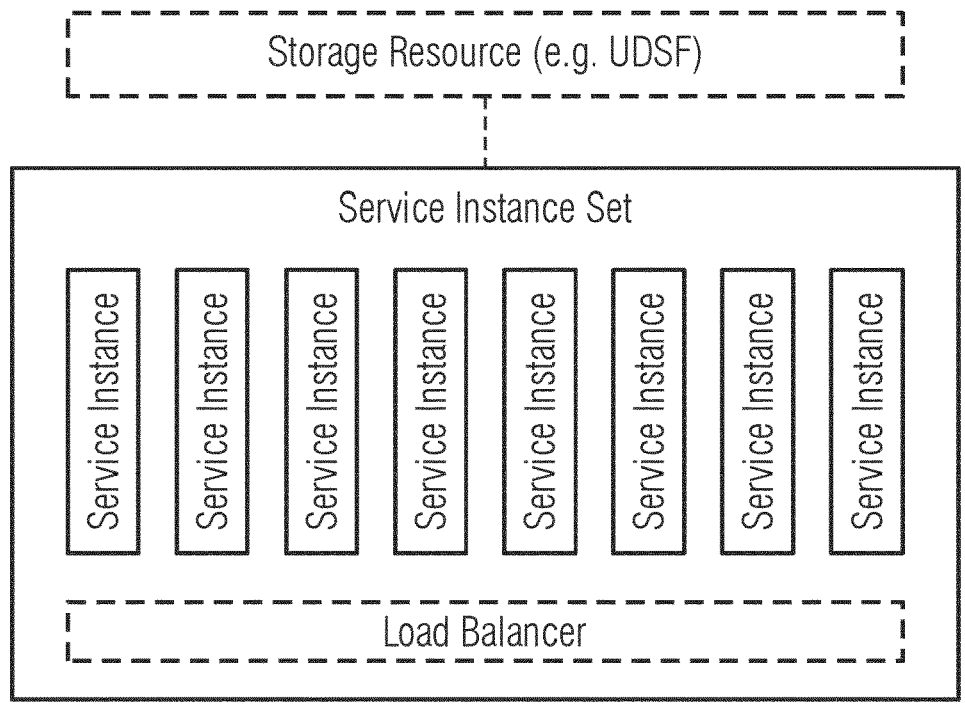
FIG. 12 is a block diagram illustrating a service instance set with a shared storage resource and an optional load balancer.
Figure 13:
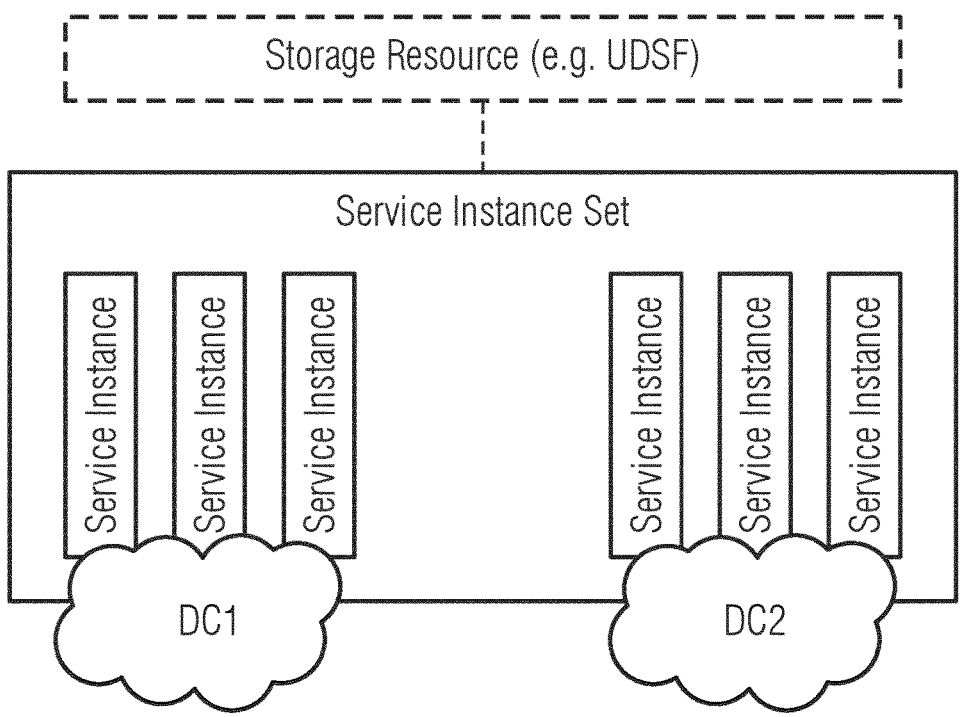
FIG. 13 is a block diagram illustrating a service instance set that spans across multiple data centers.

FIG. 11 illustrates that after NSRC is transferred, Set1 could be set out of system and Service B continues consuming Service A from Set2.

The transfer of specific group(s) of data may then be supported by the specification of the group identifiers in the transfer operations. Equally, the access (create, delete, read,

TABLE 1

Relation between SUPI, S-NSSAI, DNN, PDU Session

| SMF Selection Subscription data (data needed for SMF Selection as described in clause 6.3.2 of TS 23.501 [2]) | SUPI | Key |
| --- | --- | --- |
| | | SMF Selection Subscription data contains one or more S-NSSAI level subscription data: |
| | S-NSSAI | Indicates the value of the S-NSSAI. |
| | Subscribed DNN list | List of the subscribed DNNs for the UE (NOTE 1). |
| | Default DNN | The default DNN if the UE does not provide a DNN (NOTE 2). |
| | LBO Roaming Information | Indicates whether LBO roaming is allowed per DNN, or per (S-NSSAI, subscribed DNN) |
| UE context in SMF data | SUPI | Key |
| | PDU Session Id(s) | List of PDU Session Id(s) for the UE For each PDU Session Id: |
| | DNN | DNN for the PDU Session. |
| | SMF | Allocated SMF for the PDU Session. Includes SMF IP Address and SMF NF Id. | update, subscription, notification) to specific group(s) of data may as well be done using the group identifiers.

The separation of service logic and data, which may be an assumption for some embodiments described herein may facilitate applying cloud-native design principles for services in the SBA domain.

In order to be able to support multi vendor service instances of the same service type, and be able to recover network service, some embodiments described herein may identify the context data to be available in an alternative Set when a former Set is set out of the system.

Operations of control service node/entity/function/server 1401 will now be discussed with reference to the flow chart of FIG. 17 according to some embodiments. For example, modules may be stored in memory 1405 of FIG. 14, and these modules may provide instructions so that when the instructions of a module are executed by processor 1403, processor 1403 performs respective operations of the flow chart of FIG. 17.

At block 1701, processor 1703 may receive (through network interface 1407) instance registrations for respective instances of a first group of instances of a service provided within the communication network, and each of the instance registrations for the instances of the first group may include a same first address. Operations of block 1501 may be performed as discussed above with respect to operation 1 of FIG. 3.

At block 1703, processor 1403 may receive (through network interface 1407) instance registrations for respective instances of a second group of instances of the service provided within the communication network, and each of the instance registrations for the instances of the second group may include a same second address, with the first and second addresses being different. Operations of block 1703 may be performed as discussed above with respect to operation 2 of FIG. 3.

At block 1705, processor 1403 may transmit (through network interface 1407) a service registration for the first and second groups of instances of the service to a registration node, with the service registration being transmitted based on receiving the instance registrations for the first and second groups of instances. The service registration may include a service address, with the service address being different than the first address, and with the service identifier being different than the second address. Operations of block 1705 may be performed as discussed above with respect to operation 3 of FIG. 3.

At block 1707, processor 1403 may receive (through network interface 1407) a first operation request for the service from a consumer node of the communication network, wherein the first operation request includes the service address and a context for a device, session, and/or subscription. Operations of block 1707 may be performed as discussed above with respect to operation 6 of FIG. 4.

At block 1709, processor 1403 may select the first address responsive to receiving the operation request for the service. Operations of block 1709 may be performed as discussed above with respect to operation 7 of FIG. 4.

At block 1711, processor may transmit a second operation request for the service from the control service node to an access (SPoA) node for the first group of instances of the service responsive to selecting the first address. The second operation request may include the first address and the context for the device, session, and/or subscription. Operations of block 1711 may be performed as discussed above with respect to operation 8 of FIG. 4. At block 1713, processor may store a mapping between the context and the first address, for example, based on the selecting of block 1509.

At block 1715, processor 1403 may receive (through network interface 1407) a first operation response from an instance of the first group of instances, with the first operation response corresponding to the second operation request, and with the first operation response relating to the context for the device, session, and/or subscription. Operations of block 1715 may be performed as discussed above with respect to operation 10 of FIG. 4.

At block 1717, processor 1403 may transmit (through network interface 1407) a second operation response to the consumer device, with the second operation response corresponding to the first operation response, and with the second operation response relating to the context for the device, session, and/or subscription. Operations of block 1717 may be performed as discussed above with respect to operation 10 of FIG. 4.

At block 1719, processor 1403 may delete the mapping between the context and the first address responsive to the first operation response of block 1715 including an indication of deletion of the context.

According to some other embodiments, operation responses may be transmitted directly from instances to consumer nodes bypassing the control service node, so that operations 1715, 1717, and 1719 may be omitted. In such embodiments, processor 1403 may receive (through network interface 1407) a request from an instance of the first group of instances, with the request including an indication of deletion of the context. Responsive to receiving such a request, processor 1403 may delete the mapping between the context and the first address. Such operations are discussed above with respect to operation 11 of FIG. 4.

Figure 17:
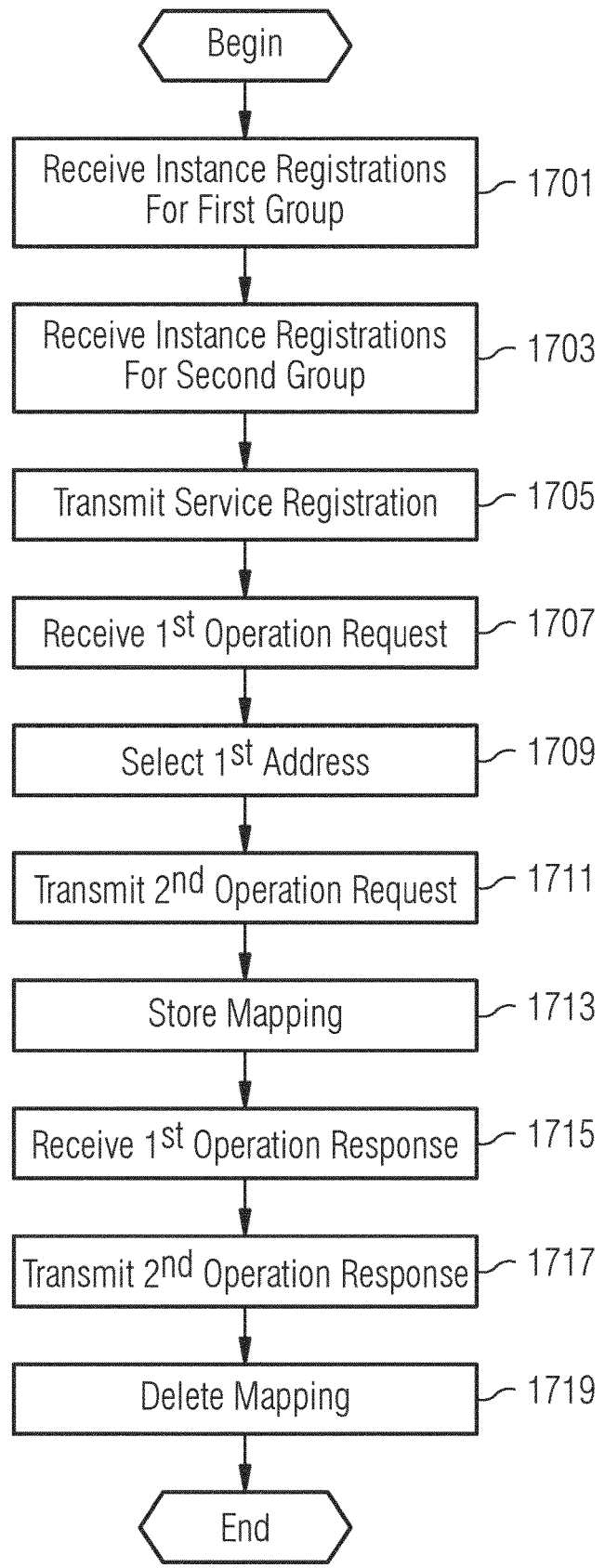
FIGS. 17-19 are flow charts illustrating operations of a control service node according to some embodiments.

Various operations from the flow chart of FIG. 17 may be optional with respect to some embodiments of control service nodes and related methods. Regarding methods of some embodiments, for example, operations of blocks 1707, 1709, 1711, 1713, 1715, 1717, and 1719 of FIG. 17 may be optional.

Operations of control service node/entity/function/server 1401 will now be discussed with reference to the flow chart of FIG. 18 according to some embodiments. For example, modules may be stored in memory 1405 of FIG. 14, and these modules may provide instructions so that when the instructions of a module are executed by processor 1403, processor 1403 performs respective operations of the flow chart of FIG. 18.

At block 1801, processor 1403 may receive (through network interface 1407) instance registrations for respective instances of a service provided within the communication network.

At block 1803, processor 1403 may transmit (through network interface 1407) a service registration for the instances of the service to a registration node, with the service registration being transmitted based on receiving the instance registrations, with the service registration including a service address, and with the service address being different than instance addresses of the respective instances. At block 1805, processor 1403 may receive (through network interface 1407) a first operation request for the service from a consumer node of the communication network, with the first operation request including the service address and a context for a device, session, and/or subscription. At block 1807, processor 1403 may select a respective one of the instances of the service responsive the operation request for the service. At block 1809, processor 1403 may transmit (through network interface 1407) a second operation request for the service from the control service node to the instance selected responsive to the operation request, with the second operation request including the context for the device, session, and/or subscription.

Figure 18:
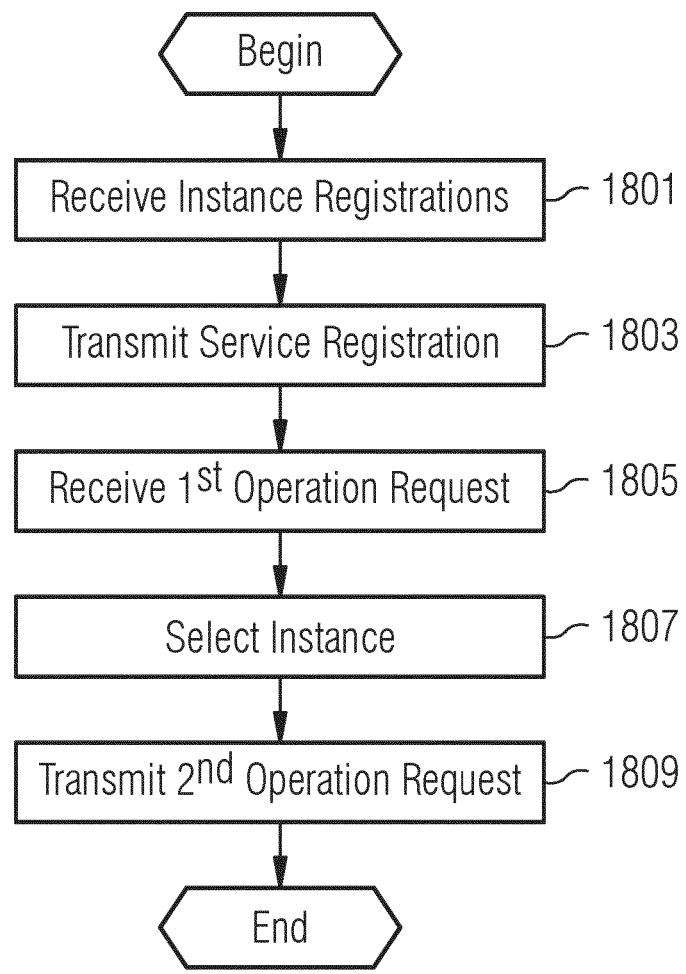

Various operations from the flow chart of FIG. 18 may be optional with respect to some embodiments of control service nodes and related methods.

Figure 19:
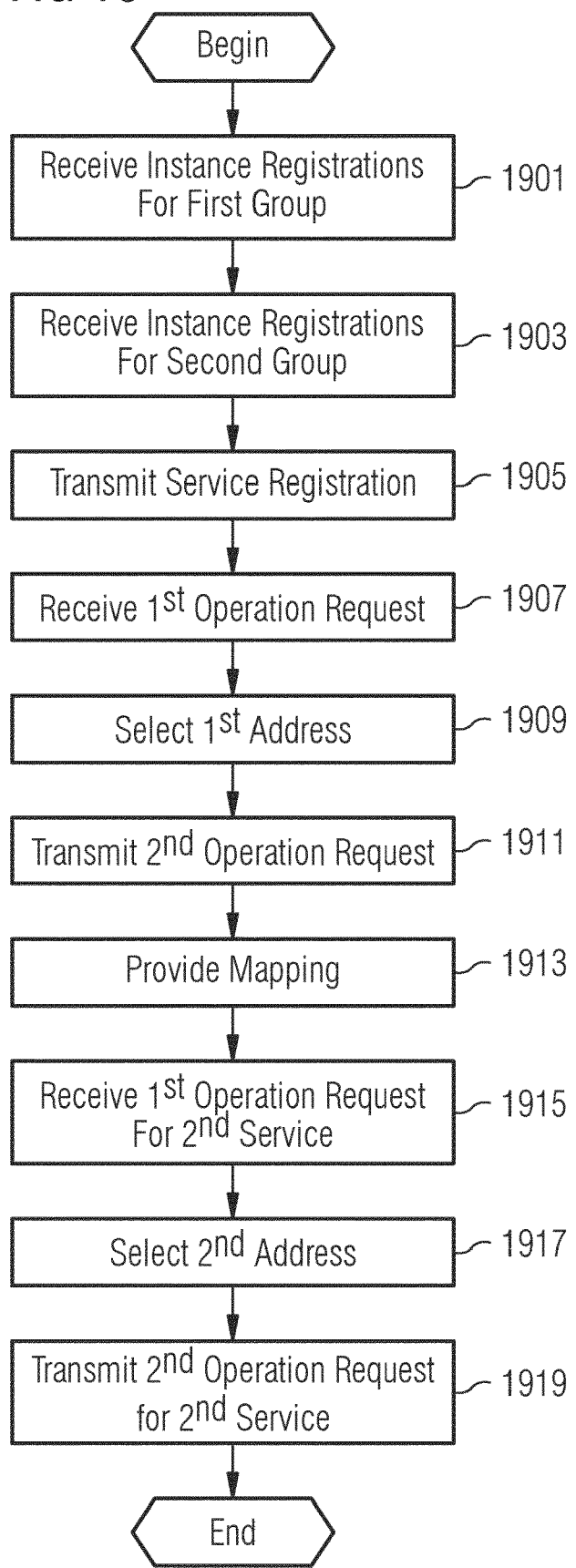

Operations of control service node/entity/function/server 1401 will now be discussed with reference to the flow chart of FIG. 19 according to some embodiments. For example, modules may be stored in memory 1405 of FIG. 14, and these modules may provide instructions so that when the instructions of a module are executed by processor 1403, processor 1403 performs respective operations of the flow chart of FIG. 19.

At block 1901, processor 1403 may receive (through network interface 1407) instance registrations for respective instances of a first group of instances of a first service provided within the communication network. Each of the instance registrations for the instances of the first group may include a first address. Operations of block 1901 may be performed as discussed above with respect to operation 0 of FIG. 5.

At block 1903, processor 1403 may receive (through network interface 1407) instance registrations for respective instances of a second group of instances of a second service provided within the communication network. Each of the registrations for the instances of the second group may include a second address, the first and second addresses may be different, and the first and second services may be different. Operations of block 1903 may be performed as discussed above with respect to operation 0 of FIG. 5.

At block 1905, processor 1403 may transmit a service registration for the first and second groups of instances, wherein the service registration is transmitted based on receiving the instance registrations for the first group of instances and the second group of instances. The service registration may include a service address, the service address may be different than the first address, and the service address may be different than the second address. Operations of block 1905 may be performed as discussed above with respect to operation 1 of FIG. 5.

At block 1907, processor 1403 may receive (through network interface 1407) a first operation request for the first service from a consumer node of the communication network. The first operation request may include the service address and a context for a device, session, and/or subscription. Operations of block 1907 may be performed as discussed above with respect to operation 4 of FIG. 5.

At block 1909, processor may select the first address responsive to receiving the first operation request for the first service. Operations of block 1909 may be performed as discussed above with respect to operation 5 of FIG. 5.

At block 1911, processor 1403 may transmit (through network interface 1407) a second operation request for the first service from the control service node to an access node for the first group of instances of the first service responsive to selecting the first address. The second operation request may include the first address and the context for the device, session, and/or subscription. Operations of block 1911 may be performed as discussed above with respect to operation 6 of FIG. 5.

At block 1913, processor 1403 may provide a mapping between the context and the first address and the between the context and the second address responsive to selecting the first address.

At block 1915, processor 1403 may receive (through network interface 1407) a first operation request for the second service. The first operation request for the second service may include the service address and the context for the device, session, and/or subscription. Operations of block 1915 may be performed as discussed above with respect to operation 12 of FIG. 5.

At block 1917, processor 1403 may select the second address responsive to receiving the first operation request for the second service. Processor 1403, for example, may select the second address based on the mapping of block 1913. Operations of block 1917 may be performed as discussed above with respect to operation 13 of FIG. 5.

At block 1919, processor 1403 may transmit (through network interface 1407) a second operation request for the second service from the control service node to an access (SPoA) node for the second group of instances of the second service responsive to selecting the second address. The second operation request may include the second address and the context for the device, session, and/or subscription. Operations of block 1919 may be performed as discussed above with respect to operation 14 of FIG. 5.

Various operations from the flow chart of FIG. 17 may be optional with respect to some embodiments of control service nodes and related methods. Regarding methods of some embodiments, for example, operations of blocks 1907, 1909, 1911, 1913, 1915, 1917, and 1919 of FIG. 17 may be optional.

According to some embodiments, the control service node may be collocated in a Unified Data Management UDM node and/or a UDR node so that embodiments herein may be performed in the UDM and/UDR node. In such embodiments as applied to FIG. 3, for example, the controller registrations of operations 1 and 2 may be replaced by a registration/update of information in the UDM and/or Unified Data Repository UDR.

According to some embodiments, a service instances may not need to register an SPoA for the respective set, but instead, the service instances may register each individual address in the control service node. The control service node may then select one of the instances within the set based on different criteria (e.g., load). In such embodiments, a separate SPoA may not be needed for the set, and it may be up to the control service node to perform selection of any instance within the set.

According to some embodiment, mapping may not be required. For example, the control service node may be able to uniquely identify a corresponding set based on parameters (e.g., context) received (e.g., by a hash).

Operations of a service instance set/node/entity/function/server 1501 (e.g., a first service instance set) will now be discussed with reference to the flow chart of FIG. 20 according to some embodiments. For example, modules may be stored in memory 1505 of FIG. 15, and these modules may provide instructions so that when the instructions of a module are executed by processor 1503, processor 1503 performs respective operations of the flow chart of FIG. 20.

At block 2001, processor 1503 may transmit (through network interface 1507) an access context request to a first storage resource node associated with the service instance set. The first storage resource node may store context for a service, and the first service instance set may be for the service. The access context request may include an identification for a subgroup of context data being requested from the first storage resource node.

At block 2003, processor 1503 may receive (through network interface 1507) an access context response from the first storage resource node. The access context response may correspond to the access context request. The access context response may include the subgroup of context data corresponding to the identification.

At block 2005, processor 1503 may transmit (through interface 1507) a move context communication including the subgroup of context data corresponding to the identification to initiate moving the subgroup of context data to a second storage resource node associated with a second service instance set for the service.

The context data from the first storage resource node may be network service restoration context data. The subgroup of context data from the first storage resource node may be a subgroup of the network service restoration context data. The network service restoration context data may be stored in the first storage resource node with vendor specific context data and the subgroup of context data may exclude the vendor specific context data. The vendor specific context data may include vendor specific implementation context data and/or vendor specific proprietary context data.

The identification may correspond to a selected protocol data unit PDU session of a plurality of protocol data unit sessions, and the subgroup of context data may be context data for the selected protocol data unit. The subgroup of context data may exclude context data from the first storage resource node for at least one protocol data unit session of the plurality other than the selected protocol data unit.

The identification may correspond to a selected network slice of a plurality of network slices, and the subgroup of context data may include context data for the selected network slice. The subgroup of context data may exclude context data from the first storage resource node for at least one network slice of the plurality of network slices other than the selected network slice. The identification may correspond to a selected subscriber identification of a plurality of subscriber identifications. The subgroup of context data may include context data for the selected subscriber identification, and the subgroup of context data may exclude context data from the first storage resource node for at least one subscriber identification of the plurality of identifications other than the selected subscriber identification. The selected subscriber identification may include a subscriber permanent identifier, and the plurality of subscriber identifications may include a plurality of subscriber permanent identifiers.

The identification may correspond to a selected data network name of a plurality of data network names. The subgroup of context data may include context data for the selected data network name, and the subgroup of context data may exclude context data from the first storage resource node for at least one data network name of the plurality of data network name other than the selected data network name.

Transmitting of the access context request may include transmitting the access context request responsive to receiving a get context request from a service controller node. Transmitting the move context communication may include transmitting a get context response including the subgroup of context data to the service controller node.

The get context request may be received from a service controller node through an access node, and wherein the get context response is transmitted to the service controller node through the access node.

Transmitting the move context communication may include transmitting a store context request including the subgroup of context data to the second service instance set. The store context request is transmitted to the second service instance set through an access node.

The access context request may be transmitted responsive to at least one of receiving a transfer context request from a service controller node and/or through an access node, an internal trigger and/or event, and/or an instruction from an operation and maintenance node.

The first service instance set may include a first plurality of instances of the service and the second service instance set may include a second plurality of instances of the service.

Figure 20:
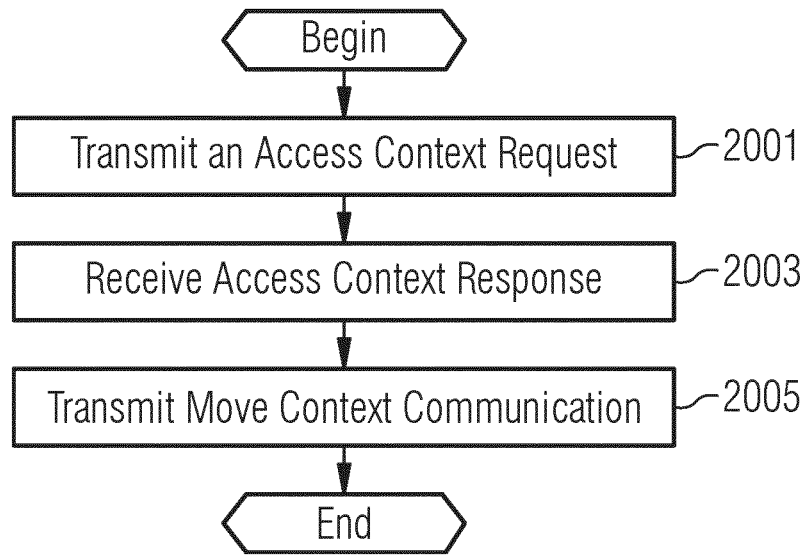
FIGS. 20 and 21 are flow charts illustrating operations of service instance sets (also referred to as service instance set nodes) according to some embodiments.

Various operations from the flow chart of FIG. 20 may be optional with respect to some embodiments of service instance sets and related methods. Regarding methods of some embodiments, for example, operations of blocks 2005 of FIG. 20 may be optional.

Operations of a service instance set/node/entity/function/server 1501 (e.g., a first service instance set) will now be discussed with reference to the flow chart of FIG. 21 according to some embodiments. For example, modules may be stored in memory 1505 of FIG. 15, and these modules may provide instructions so that when the instructions of a module are executed by processor 1503, processor 1503 performs respective operations of the flow chart of FIG. 21.

At block 2101, processor 1501 may transmit (through network interface 1507) a modify context request to a storage resource node associated with the service instance set, where the storage resource node stores context data for the service. The modify context request may include an identification for a subgroup of context data of the storage resource node to be modified.

The context data of the storage resource node may include network service restoration context data. The subgroup of context data of the storage resource node may be a subgroup of the network service restoration context data. The network service restoration context data may be stored in the storage resource node with vendor specific context data. The subgroup of context data may exclude the vendor specific context data. The vendor specific context data may include vendor specific implementation context data and/or vendor specific proprietary context data. The modify context request may be a create context request. The create context request may include context data corresponding to the subgroup to be used by the storage resource node to create the subgroup of context data.

The modify context request may be an update context request. The update context request may include context data corresponding to the subgroup to be used by the storage resource node to update the subgroup of context data.

The modify context request may be a delete context request instructing the storage resource node to delete the subgroup of context data.

Figure 21:
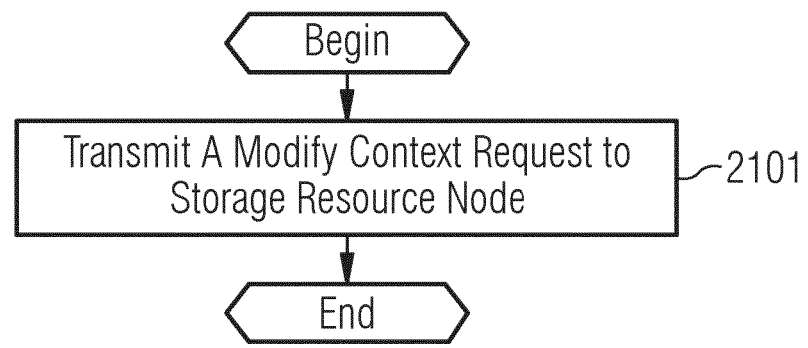

Various operations from the flow chart of FIG. 21 may be optional with respect to some embodiments of service instance sets and related methods.

Figure 22:
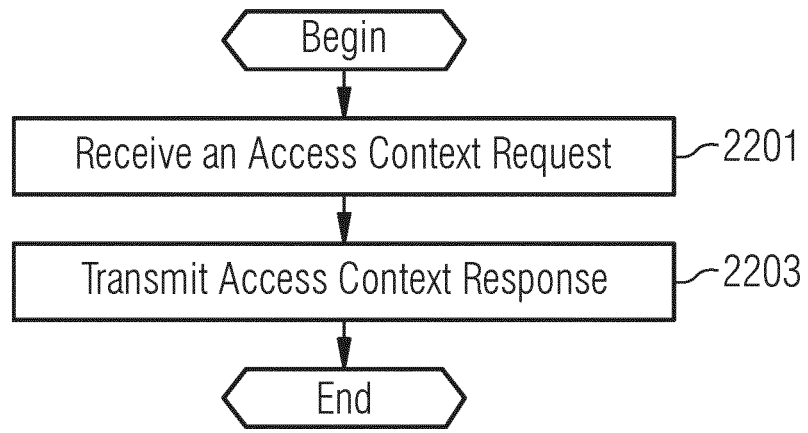
FIGS. 22 and 23 are flow charts illustrating operations of storage resource nodes according to some embodiments.

Operations of a storage resource node/entity/function/server 1601 will now be discussed with reference to the flow chart of FIG. 22 according to some embodiments. For example, modules may be stored in memory 1605 of FIG. 16, and these modules may provide instructions so that when the instructions of a module are executed by processor 1603, processor 1603 performs respective operations of the flow chart of FIG. 22. The storage resource node may be associated with a service instance set for a service and the storage resource node stores context data for the service.

At block 2201, processor 1603 may receive (through network interface 1607) an access context request from a service instance set associated with the storage resource node. The access context request may include an identification for a subgroup of context data being requested.

At block 2203, processor 1603 may transmit (through network interface 1607)) an access context response to the service instance set responsive to receiving the access context request including the identifier. The access context response may include the subgroup of context data corresponding to the identification.

The identification may correspond to a selected protocol data unit session of a plurality of protocol data unit sessions. The subgroup of context data may include context data for the selected protocol data unit. The subgroup of context data may exclude context data from the storage resource node for at least one protocol data unit session of the plurality other than the selected protocol data unit.

The identification may correspond to a selected network slice of a plurality of network slices. The subgroup of context data may include context data for the selected network slice.

The subgroup of context data may exclude context data from the storage resource node for at least one network slice of the plurality of network slices other than the selected network slice. The identification may correspond to a selected subscriber identification of a plurality of subscriber identifications. The subgroup of context data may include context data for the selected subscriber identification. The subgroup of context data may exclude context data from the storage resource node for at least one subscriber identification of the plurality of identifications other than the selected subscriber identification.

The selected subscriber identification may be a subscriber permanent identifier. The plurality of subscriber identifications may include a plurality of subscriber permanent identifiers.

The identification may correspond to a selected data network name of a plurality of data network names. The subgroup of context data may include context data for the selected data network name. The subgroup of context data may exclude context data from the storage resource node for at least one data network name of the plurality of data network name other than the selected data network name.

The service instance set may include a plurality of instances of the service.

The context data from the storage resource node may be network service restoration context data. The subgroup of context data from the storage resource node may include a subgroup of the network service restoration context data. The network service restoration context data may be stored in the storage resource node with vendor specific context data. The subgroup of context data may exclude the vendor specific context data. The vendor specific context data includes vendor specific implementation context data and/or vendor specific proprietary context data.

Figure 23:
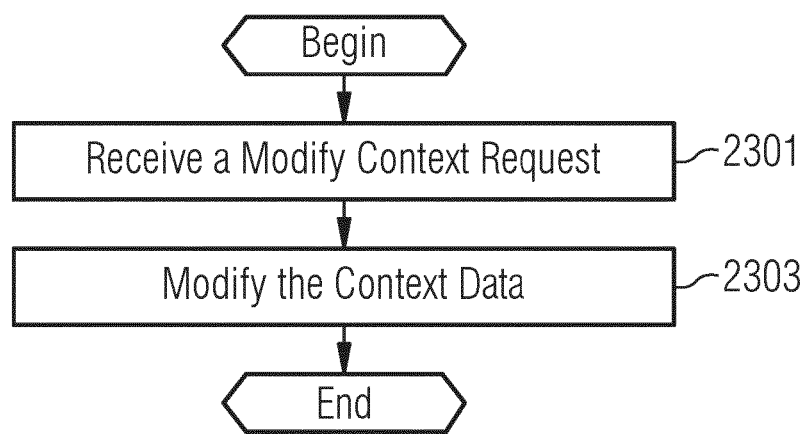

Various operations from the flow chart of FIG. 23 may be optional with respect to some embodiments of service instance sets and related methods.

Operations of a storage resource node/entity/function/server 1601 will now be discussed with reference to the flow chart of FIG. 23 according to some embodiments. For example, modules may be stored in memory 1605 of FIG. 16, and these modules may provide instructions so that when the instructions of a module are executed by processor 1603, processor 1603 performs respective operations of the flow chart of FIG. 23. The storage resource node may be associated with a service instance set for a service and the storage resource node stores context data for the service.

At block 2301, processor 1603 may receive (through network interface 1607) a modify context request from a service instance set associated with the storage resource node. The modify context request may include an identification for a subgroup of context data to be modified.

At block 2303, processor 1603 may modify the context data of the storage resource node responsive to the modify context request including the identification for the subgroup of the context data.

The context data of the storage resource node may be network service restoration context data. The subgroup of context data of the storage resource node may include a subgroup of the network service restoration context data. The network service restoration context data may be stored in the storage resource node with vendor specific context data. The subgroup of context data may exclude the vendor specific context data. The vendor specific context data may include vendor specific implementation context data and/or vendor specific proprietary context data. The modify context request may be a create context request. The create context request may include context data corresponding to the subgroup. Modifying the context data may include using the context data corresponding to the subgroup to create the subgroup of context data.

The modify context request may be an update context request. The update context request may include context data corresponding to the subgroup. Modifying the context data may include using the context data corresponding to the subgroup to update the subgroup of context data. The modify context request may be a delete context request. Modifying the context data may include deleting the subgroup of context data.

Various operations from the flow chart of FIG. 23 may be optional with respect to some embodiments of service instance sets and related methods.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Abbreviations used in the above disclosure:

| Abbreviation | Explanation |
| --- | --- |
| 3GPP | 3rd. Generation Partnership Project |
| 5GC | 5th Generation Core Network |
| AMF | Access and Mobility Management Function |
| API | Application Programming Interface |
| CN | Core Network |
| CNA | Cloud Native Architecture |
| DC | Data Center |
| DNN | Data Network Name |
| DNS | Domain Name Server |
| LB | Load Balancer |
| LCM | Life Cycle Management |
| NF | Network Function |
| NRF | Network Repository Function |
| NSSAI | Network Slice Selection Assistance Information |
| PDU | Protocol Data Unit |
| SBA | Service based Architecture |
| SIS | Service Instance Set |
| SPoA | Single Point of Access |
| SUPI | Subscriber Permanent Identifier |
| UDSF | Unstructured Data Storage Function |
| UE | User Equipment |
| URI | Uniform Resource Identifier |

The invention claimed is:

1. A method of operating a first service instance set associated with a first storage resource node, the first service instance set being for a service, and the first storage resource node storing context data for the service, the method comprising:
transmitting an access context request to the first storage resource node, the access context request including an identification for a subgroup of context data being requested from the first storage resource node, the subgroup of context data including a subgroup of network service restoration context (NSRC) data, the subgroup of NSRC data including context data used to recover an expected network state in an event of failure, the network service restoration context data stored in the first storage resource node with vendor specific context data, the subgroup of context data excluding the vendor specific context data, and the vendor specific context data including at least one of vendor specific implementation context data and vendor specific proprietary context data; and
receiving an access context response from the first storage resource node, the access context response corresponding to the access context request, and the access context response including the subgroup of context data corresponding to the identification.

2. The method of claim 1 further comprising:
transmitting a move context communication including the subgroup of context data corresponding to the identification to initiate moving the subgroup of context data to a second storage resource node associated with a second service instance set for the service.

3. The method of claim 1, wherein the identification corresponds to a selected protocol data unit session of a plurality of protocol data unit sessions, and wherein the subgroup of context data comprises context data for the selected protocol data unit.

4. The method of claim 3, wherein the subgroup of context data excludes context data from the first storage resource node for at least one protocol data unit session of the plurality other than the selected protocol data unit.

5. The method of claim 1, wherein the identification corresponds to a selected network slice of a plurality of network slices, and wherein the subgroup of context data comprises context data for the selected network slice.

6. The method of claim 5, wherein the subgroup of context data excludes context data from the first storage resource node for at least one network slice of the plurality of network slices other than the selected network slice.

7. The method of claim 1, wherein the identification corresponds to a selected subscriber identification of a plurality of subscriber identifications, and wherein the subgroup of context data comprises context data for the selected subscriber identification.

8. The method of claim 7, wherein the subgroup of context data excludes context data from the first storage resource node for at least one subscriber identification of the plurality of identifications other than the selected subscriber identification.

9. The method of claim 7, wherein the selected subscriber identification comprises a subscriber permanent identifier, and wherein the plurality of subscriber identifications comprises a plurality of subscriber permanent identifiers.

10. The method of claim 1, wherein the identification corresponds to a selected data network name of a plurality of data network names, and wherein the subgroup of context data comprises context data for the selected data network name.

11. The method of claim 10, wherein the subgroup of context data excludes context data from the first storage resource node for at least one data network name of the plurality of data network name other than the selected data network name.

12. The method of claim 1, wherein transmitting the access context request comprises transmitting the access context request responsive to receiving a get context request from a service controller node, and wherein transmitting the move context communication comprises transmitting a get context response including the subgroup of context data to the service controller node.

13. The method of claim 12, wherein the get context request is received from a service controller node through an access node, and wherein the get context response is transmitted to the service controller node through the access node.

14. The method of claim 1, wherein transmitting the move context communication comprises transmitting a store context request including the subgroup of context data to the second service instance set.

15. The method of claim 14, wherein the store context request is transmitted to the second service instance set through an access node.

16. The method of claim 1, wherein the access context request is transmitted responsive to at least one of receiving a transfer context request from a service controller node, through an access node, at least one of an internal trigger and event, and an instruction from an operation and maintenance node.

17. The method of claim 1, wherein the first service instance set comprises a first plurality of instances of the service, and wherein the second service instance set comprises a second plurality of instances of the service.

18. A method of operating a service instance set associated with a storage resource node, the service instance set being for a service, and the storage resource node storing context data for the service, the method comprising:
transmitting a modify context request to the storage resource node, the modify context request including an identification for a subgroup of context data of the storage resource node to be modified, the subgroup of context data including a subgroup of network service restoration context (NSRC) data, the subgroup of NSRC data including context data used to recover an expected network state in an event of failure, the network service restoration context data stored in the storage resource node with vendor specific context data, the subgroup of context data excluding the vendor specific context data and the vendor specific context data including at least one of vendor specific implementation context data and vendor specific proprietary context data.

19. The method of claim 18, wherein the modify context request is a create context request, and wherein the create context request includes context data corresponding to the subgroup to be used by the storage resource node to create the subgroup of context data.

20. The method of claim 18, wherein the modify context request is an update context request, and wherein the update context request includes context data corresponding to the subgroup to be used by the storage resource node to update the subgroup of context data.

21. The method of claim 18, wherein the modify context request is a delete context request instructing the storage resource node to delete the subgroup of context data.

22. The method of claim 18, wherein the identification corresponds to a selected protocol data unit session of a plurality of protocol data unit sessions, and wherein the subgroup of context data comprises context data for the selected protocol data unit.

23. The method of claim 22, wherein the subgroup of context data excludes context data from the storage resource node for at least one protocol data unit session of the plurality other than the selected protocol data unit.

24. A method of operating a storage resource node associated with a service instance set for a service, the storage resource node storing context data for the service, the method comprising:
receiving an access context request from the service instance set, the access context request including an identification for a subgroup of context data being requested, the network service restoration context data stored in the first storage resource node with vendor specific context data, the subgroup of context data excluding the vendor specific context data, and the vendor specific context data including at least one of vendor specific implementation context data and vendor specific proprietary context data; and
transmitting an access context response to the service instance set responsive to receiving the access context request including the identifier, the access context response including the subgroup of context data corresponding to the identification, the subgroup of context data including a subgroup of network service restoration context (NSRC) data, the subgroup of NSRC data including context data used to recover an expected network state in an event of failure.

* * * * *